(12) United States Patent
El-Monajjed et al.

(10) Patent No.: US 11,644,897 B2
(45) Date of Patent: *May 9, 2023

(54) USER TRACKING SYSTEM USING USER FEATURE LOCATION AND METHOD, AND DIGITAL DISPLAY DEVICE AND DIGITAL IMAGE RENDERING SYSTEM AND METHOD USING SAME

(71) Applicant: EVOLUTION OPTIKS LIMITED, Christ Church (BB)

(72) Inventors: Khaled El-Monajjed, Montreal (CA); Guillaume Lussier, Montreal (CA); Faleh Mohammad Faleh Altal, Montreal (CA); Daniel Gotsch, Redwood City, CA (US)

(73) Assignee: EVOLUTION OPTIKS LIMITED, Bridgetown (BB)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,273

(22) Filed: Jun. 2, 2022

(65) Prior Publication Data

US 2022/0342478 A1 Oct. 27, 2022

Related U.S. Application Data

(63) Continuation-in-part of application No. 17/239,385, filed on Apr. 23, 2021, now Pat. No. 11,385,712,
(Continued)

(30) Foreign Application Priority Data

Apr. 1, 2019 (CA) ................................ CA 3038584

(51) Int. Cl.
*G06F 3/01* (2006.01)
*G09G 3/02* (2006.01)

(52) U.S. Cl.
CPC .............. *G06F 3/013* (2013.01); *G09G 3/02* (2013.01); *G09G 2320/0261* (2013.01)

(58) Field of Classification Search
CPC ..................... G06F 3/013; G09G 3/02; G09G 2320/0261; G06V 40/19; A61B 3/113; A61B 5/11
See application file for complete search history.

(56) References Cited

U.S. PATENT DOCUMENTS 6,669,651 B1  12/2003  Fukushima et al.
7,572,008 B2  8/2009  Elvesjo et al.
(Continued)

FOREIGN PATENT DOCUMENTS

WO  2018000020 A1  1/2018

OTHER PUBLICATIONS

Fuhl W. et al. "PupilNet v2.0: Convolutional Neural Network for CPU based real time Robust Pupil Detection", arXiv: 1711.00112, 2017.
(Continued)

*Primary Examiner* — Richard J Hong
(74) *Attorney, Agent, or Firm* — Knobbe, Martens, Olson & Bear, LLP

(57) ABSTRACT

Described are various embodiments of a pupil tracking system and method, and digital display device and digital image rendering system and method using same. In one embodiment, a computer-implemented method for improving a perceptive experience of light field content projected via a light field display within a light field viewing zone comprises sequentially acquiring a user feature location, and comparing a velocity computed therefrom with a designated threshold velocity. Upon the velocity corresponding with a transition from a relatively dynamic to a relatively static state, a rendering geometry of the light field content is adjusted to project the light field content within an adjusted (Continued)

light field viewing zone in accordance with a newly acquired user feature location.

26 Claims, 10 Drawing Sheets

Related U.S. Application Data which is a continuation of application No. PCT/IB2020/053035, filed on Mar. 31, 2020.

(60) Provisional application No. 62/929,599, filed on Nov. 1, 2019.

(56) References Cited

U.S. PATENT DOCUMENTS

| | | | |
|---|---|---|---|
| 8,066,375 | B2 | 11/2011 | Skogö et al. |
| 8,120,577 | B2 | 2/2012 | Bouvin et al. |
| 8,342,687 | B2 | 1/2013 | Blixt et al. |
| 8,824,779 | B1 | 9/2014 | Smyth |
| 8,885,882 | B1 | 11/2014 | Yin et al. |
| 2002/0181774 | A1* | 12/2002 | Ishikura ............ G06V 40/19 382/190 |
| 2004/0170304 | A1* | 9/2004 | Haven ............... G06V 40/19 382/115 |
| 2005/0073136 | A1* | 4/2005 | Larsson ............. A61B 5/11 180/272 |
| 2014/0327771 | A1 | 11/2014 | Malachowsky et al. |
| 2015/0077313 | A1* | 3/2015 | Gao ................. G06F 3/013 345/8 |
| 2015/0223684 | A1 | 8/2015 | Hinton |
| 2015/0338915 | A1 | 11/2015 | Publicover et al. |
| 2016/0062459 | A1 | 3/2016 | Publicover et al. |
| 2016/0066781 | A1* | 3/2016 | Thompson ........... A61B 3/113 351/209 |
| 2016/0085302 | A1 | 3/2016 | Publicover et al. |
| 2016/0148050 | A1 | 5/2016 | Lee |
| 2016/0166146 | A1 | 6/2016 | Sarkar |
| 2016/0274660 | A1 | 9/2016 | Publicover et al. |
| 2016/0335475 | A1 | 11/2016 | Krenzer et al. |
| 2017/0011492 | A1 | 1/2017 | Thunström et al. |
| 2017/0353717 | A1 | 12/2017 | Zhou et al. |
| 2018/0008141 | A1 | 1/2018 | Krueger |
| 2018/0011533 | A9 | 1/2018 | Marggraff et al. |
| 2018/0136722 | A1 | 5/2018 | Mallinson |
| 2018/0143684 | A1 | 5/2018 | Kuldkepp et al. |
| 2018/0181809 | A1 | 6/2018 | Ranjan et al. |
| 2018/0206771 | A1 | 7/2018 | Kobetski et al. |
| 2018/0224933 | A1 | 8/2018 | George-Svahn et al. |

OTHER PUBLICATIONS

Kar A. & Corcoran P., "A Review and Analysis of Eye-Gaze Estimation Systems, Algorithms and Performance Evaluation Methods in Consumer Platforms", IEEE Access, vol. 5, pp. 16495-16519, 2017.

Kim M., Wang O., Ng N., Convolutional Neural Network Architectures for Gaze Estimation on Mobile Device, Course Project Report, CS231n: Convolutional Neural Networks for Visual Recognition, 2017.

Koko & Florez "Cost Effective Ir-Free Eye Tracking On Mobile Device", Senior Research Proposal, Department of Mathematics and Computer Science, Stetson University, Florida, 2016.

Krafka K. et al. "Eye Tracking for Everyone", 2016 IEEE Conference on Computer Vision and Pattern Recognition, IEEE, pp. 2176-2184, 2016.

Naqvi R. A. et al., "Deep Learning-Based Gaze Detection System for Automobile Drivers Using a NIR Camera Sensor", Sensor, doi: 10.3390/s18020456, pp. 1-34, 2018.

Santini T. et al. "PuRe: Robust pupil detection for real-time pervasive eye tracking", arXiv:1712.08900v1, 2017.

Swirski et al. "Robust real-time pupil tracking in highly off-axis images", Proceedings of the Symposium on Eye Tracking Research and Applications, pp. 173-176, 2012.

* cited by examiner

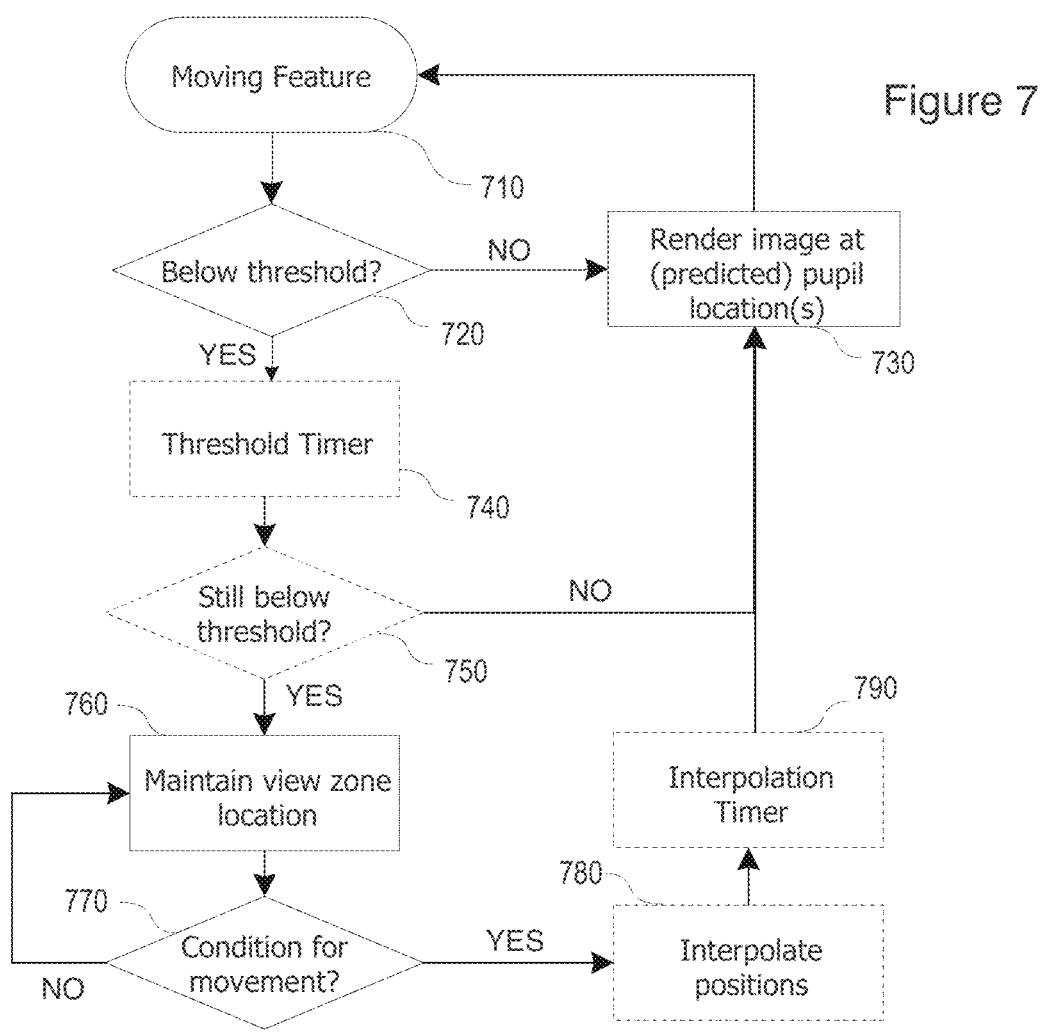

USER TRACKING SYSTEM USING USER FEATURE LOCATION AND METHOD, AND DIGITAL DISPLAY DEVICE AND DIGITAL IMAGE RENDERING SYSTEM AND METHOD USING SAME

CROSS REFERENCE TO RELATED APPLICATIONS

This application is a Continuation-in-Part of U.S. patent application Ser. No. 17/239,385 filed Apr. 23, 2021, which is a Continuation of International Application No. PCT/IB2020/053035 filed Mar. 31, 2020, which claims priority to Canadian Patent Application No. 3,038,584 filed Apr. 1, 2019, and to U.S. Provisional Patent Application No. 62/929,599 filed Nov. 1, 2019, the entire disclosure of each of which are incorporated herein by reference.

FIELD OF THE DISCLOSURE

The present disclosure relates to user tracking and digital displays, and, in particular, to a user tracking system and method, and digital display device and digital image rendering system and method using same.

BACKGROUND

Gaze tracking technologies are currently being applied in different fields, for example, in the context of display content engagement tracking, or in tracking a user's attention and/or distraction in different contexts such as while driving a vehicle. One may generally define two broad categories of gaze tracking technologies. The first category generally relies on projecting near-IR light on a user's face and detecting corneoscleral reflections (i.e. glints) on the user's eye to do so-called bright and/or dark pupil tracking. Different products of this type are available, for example TOBII (http://www.tobii.com) provides a range of products using such technology. Another broad category includes computer vision methods that rely on extracting facial features from digital images or videos. Examples of products for computer vision facial feature extraction include Face++ (https://www.faceplusplus.com) or the open-source facial feature extraction library OpenFace (https://github.com/TadasBaltrusaitis/OpenFace).

Using these techniques, a user's gaze direction can be monitored in real-time and put in context to monitor what draw's the user's attention over time.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

In accordance with one aspect, there is provided a computer-implemented method, automatically implemented by one or more digital processors, for improving a perceptive experience of light field content projected via a light field display within a light field viewing zone. The method comprises sequentially acquiring a user feature location; digitally computing from at least some the sequentially acquired user feature location a velocity of the user feature location over time; digitally comparing the velocity with a designated threshold velocity, wherein velocities below and above the designated threshold are respectively associated with a relatively static and a relatively dynamic state; digitally rendering the light field content via the light field display in accordance with a maintained light field viewing zone geometry digitally defined in respect of a previously acquired user feature location to project the light field content within a maintained light field viewing zone in accordance with the previously acquired user feature location; and upon the velocity corresponding with a transition from the relatively dynamic state to the relatively static state, digitally adjusting a rendering geometry of the light field content via the light field display so to correspondingly adjust the maintained light field viewing zone geometry to project the light field content within an adjusted light field viewing zone in accordance with a newly acquired user feature location.

In one embodiment, the method further comprises digitally adjusting the rendering geometry of the light field image via the light field display so to correspondingly adjust the maintained light field viewing zone geometry to correspond to a function of the newly acquired user feature location upon a designated condition for movement of the maintained light field viewing zone geometry being met.

In one embodiment, the designated condition for movement of the maintained light field viewing zone geometry comprises at least one of the user feature location crossing a defined boundary of the maintained light field viewing zone geometry, the maintained light field viewing zone geometry remaining static for a prescribed period of time, the velocity decreasing below a transitional velocity threshold, or at least some of the sequentially acquired user feature locations corresponding with a deceleration consistent with an expected relatively static state at an expected future feature position.

In one embodiment, the function is an interpolation or an extrapolation of the sequentially acquired user feature locations.

In one embodiment, the function is a function of time since the designated condition for movement was met.

In one embodiment, the designated period of time is between about 0.02 s and 1 s.

In one embodiment, the threshold velocity is between 0.02 m/s and 0.2 m/s.

In one embodiment, the threshold velocity is approximately 0.03 m/s.

In one embodiment, the digitally rendering the light field content via the light field display comprises digitally mapping a digital image on an adjusted image plane designated to provide the user with a designated image perception adjustment; associating adjusted image pixel data with at least some pixels of the light field display in accordance with the mapping; and rendering the adjusted image pixel data via the at least some pixels thereby rendering the light field content in accordance with a perceptively adjusted version of the digital image.

In one embodiment, the method further comprises digitally computing the designated threshold velocity in accordance with a digital calibration process.

In one embodiment, the designated threshold velocity is digitally computed as a function of a distribution parameter of the user feature locations sequentially acquired over a designated duration of the digital calibration process.

In one embodiment, the digital calibration process comprises providing a calibration indicator during the designated duration to indicate a calibration status of the digital calibration process.

In one embodiment, the sequentially acquiring the user feature location comprises sequentially acquiring a two-dimensional or a three-dimensional user feature location.

In one embodiment, the user feature location comprises a user pupil location.

In one embodiment, the user feature location corresponds at least in part to a facial landmark having a characteristic disposition with respect to a user eye.

In one embodiment, the method further comprises digitally computing the user feature location at least in part based on sequentially acquired locations of the facial landmark.

In one embodiment, the light field display is configured to render the light field content in accordance with a digital three-dimensional ray tracing process.

In accordance with another aspect, there is provided a non-transitory computer-readable medium having instructions stored thereon to be automatically implemented by one or more processors for improving a perceptive experience of light field content projected via a light field display within a light field viewing zone by: sequentially acquiring a user feature location; digitally computing from at least some the sequentially acquired user feature location a velocity of the user feature location over time; digitally comparing the velocity with a designated threshold velocity, wherein velocities below and above the designated threshold are respectively associated with a relatively static and a relatively dynamic state; digitally rendering the light field content via the light field display in accordance with a maintained light field viewing zone geometry digitally defined in respect of a previously acquired user feature location to project the light field content within a maintained light field viewing zone in accordance with the previously acquired user feature location; and upon the velocity corresponding with a transition from the relatively dynamic state to the relatively static state, digitally adjusting a rendering geometry of the light field content via the light field display so to correspondingly adjust the maintained light field viewing zone geometry to project the light field content within an adjusted light field viewing zone in accordance with a newly acquired user feature location.

In one embodiment, the non-transitory computer-readable medium further comprises instructions for digitally adjusting the rendering geometry of the light field image via the light field display so to correspondingly adjust the maintained light field viewing zone geometry to correspond to a function of the newly acquired user feature location upon a designated condition for movement of the maintained light field viewing zone geometry being met.

In one embodiment, the designated condition for movement of the maintained light field viewing zone geometry comprises at least one of the user feature location crossing a defined boundary of the maintained light field viewing zone geometry, the maintained light field viewing zone geometry remaining static for a prescribed period of time, the velocity decreasing below a transitional velocity threshold, or at least some of the sequentially acquired user feature locations corresponding with a deceleration consistent with an expected relatively static state at an expected future feature position.

In one embodiment, the function is an interpolation or an extrapolation of the sequentially acquired user feature locations.

In one embodiment, the function is a function of time since the designated condition for movement was met.

In one embodiment, the designated period of time is between about 0.02 s and 1 s.

In one embodiment, the threshold velocity is between 0.02 m/s and 0.2 m/s.

In one embodiment, the threshold velocity is approximately 0.03 m/s.

In one embodiment, the digitally rendering the light field content via the light field display comprises digitally mapping a digital image on an adjusted image plane designated to provide the user with a designated image perception adjustment; associating adjusted image pixel data with at least some pixels of the light field display in accordance with the mapping; and rendering the adjusted image pixel data via the at least some pixels thereby rendering the light field content in accordance with a perceptively adjusted version of the digital image.

In one embodiment, the non-transitory computer-readable medium further comprises instructions for digitally computing the designated threshold velocity in accordance with a digital calibration process.

In one embodiment, the designated threshold velocity is digitally computed as a function of a distribution parameter of the user feature locations sequentially acquired over a designated duration of the digital calibration process.

In one embodiment, the digital calibration process comprises providing a calibration indicator during the designated duration to indicate a calibration status of the digital calibration process.

In one embodiment, the sequentially acquiring the user feature location comprises sequentially acquiring a two-dimensional or a three-dimensional user feature location.

In one embodiment, the user feature location comprises a user pupil location.

In one embodiment, the user feature location corresponds at least in part to a facial landmark having a characteristic disposition with respect to a user eye.

In one embodiment, the non-transitory computer-readable medium further comprises digital instructions for digitally computing the user feature location at least in part based on sequentially acquired locations of the facial landmark.

In one embodiment, the light field display is configured to render the light field content in accordance with a digital three-dimensional ray tracing process.

In accordance with another aspect, there is provided a digital display device operable to improve a perceptive experience of light field content projected via a light field display within a light field viewing zone. The device comprises a light field display, a hardware processor, and a user feature tracking engine. The user feature tracking engine is operable by the hardware processor to automatically: receive as input a sequentially acquired user feature location; digitally compute from at least some the sequentially acquired user feature locations a velocity of the user feature location over time; and digitally compare the velocity with a designated threshold velocity, wherein velocities below and above the designated threshold are respectively associated with a relatively static and a relatively dynamic state. The hardware processor is operable to improve perception of the light field content by: digitally rendering the light field content via the light field display in accordance with a maintained light field viewing zone geometry digitally defined in respect of a previously acquired user feature location to project the light field content within a maintained light field viewing zone in accordance with the previously acquired user feature location; and upon the velocity corresponding with a transition from the relatively dynamic state to the relatively static state, digitally adjusting a rendering geometry of the light field content via the light field display so to correspondingly adjust the maintained light field viewing zone geometry to project the light field content within an adjusted light field viewing zone in accordance with a newly acquired user feature location.

In one embodiment, the hardware processor is further operable to improve perception of the light field content by digitally adjusting the rendering geometry of the light field image via the light field display so to correspondingly adjust the maintained light field viewing zone geometry to correspond to a function of the newly acquired user feature location upon a designated condition for movement of the maintained light field viewing zone geometry being met.

In one embodiment, the designated condition for movement of the maintained light field viewing zone geometry comprises at least one of the user feature location crossing a defined boundary of the maintained light field viewing zone geometry, the maintained light field viewing zone geometry remaining static for a prescribed period of time, the velocity decreasing below a transitional velocity threshold, or at least some of the sequentially acquired user feature locations corresponding with a deceleration consistent with an expected relatively static state at an expected future feature position.

In one embodiment, the function is an interpolation or an extrapolation of the sequentially acquired user feature locations.

In one embodiment, the function is a function of time since the designated condition for movement was met.

In one embodiment, the designated period of time is between about 0.02 s and 1 s.

In one embodiment, the threshold velocity is between 0.02 m/s and 0.2 m/s.

In one embodiment, the threshold velocity is approximately 0.03 m/s.

In one embodiment, the digitally rendering the light field content via the light field display comprises: digitally mapping a digital image on an adjusted image plane designated to provide the user with a designated image perception adjustment; associating adjusted image pixel data with at least some pixels of the light field display in accordance with the mapping; and rendering the adjusted image pixel data via the at least some pixels thereby rendering the light field content in accordance with a perceptively adjusted version of the digital image.

In one embodiment, the user feature tracking engine is further operable by the hardware processor to automatically digitally compute the designated threshold velocity in accordance with a digital calibration process.

In one embodiment, the designated threshold velocity is digitally computed as a function of a distribution parameter of the user feature locations sequentially acquired over a designated duration of the digital calibration process.

In one embodiment, the device further comprises a calibration indicator operable to indicate a calibration status of the digital calibration process during the designated duration.

In one embodiment, the sequentially acquired user feature locations comprise sequentially acquired two-dimensional or three-dimensional user feature locations.

In one embodiment, the user feature location comprises a user pupil location.

In one embodiment, the user feature location corresponds at least in part to a facial landmark having a characteristic disposition with respect to a user eye.

In one embodiment, the user feature tracking engine is further operable by the hardware processor to automatically digitally compute the sequentially acquired user feature locations at least in part based on sequentially acquired locations of the facial landmark.

In one embodiment, the light field display is configured to render the light field content in accordance with a digital three-dimensional ray tracing process.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein:

FIG. 7 is a process flow diagram illustrating another operational mode of a predictive pupil tracking method, in accordance with at least one of the various embodiments;

Figure 1:
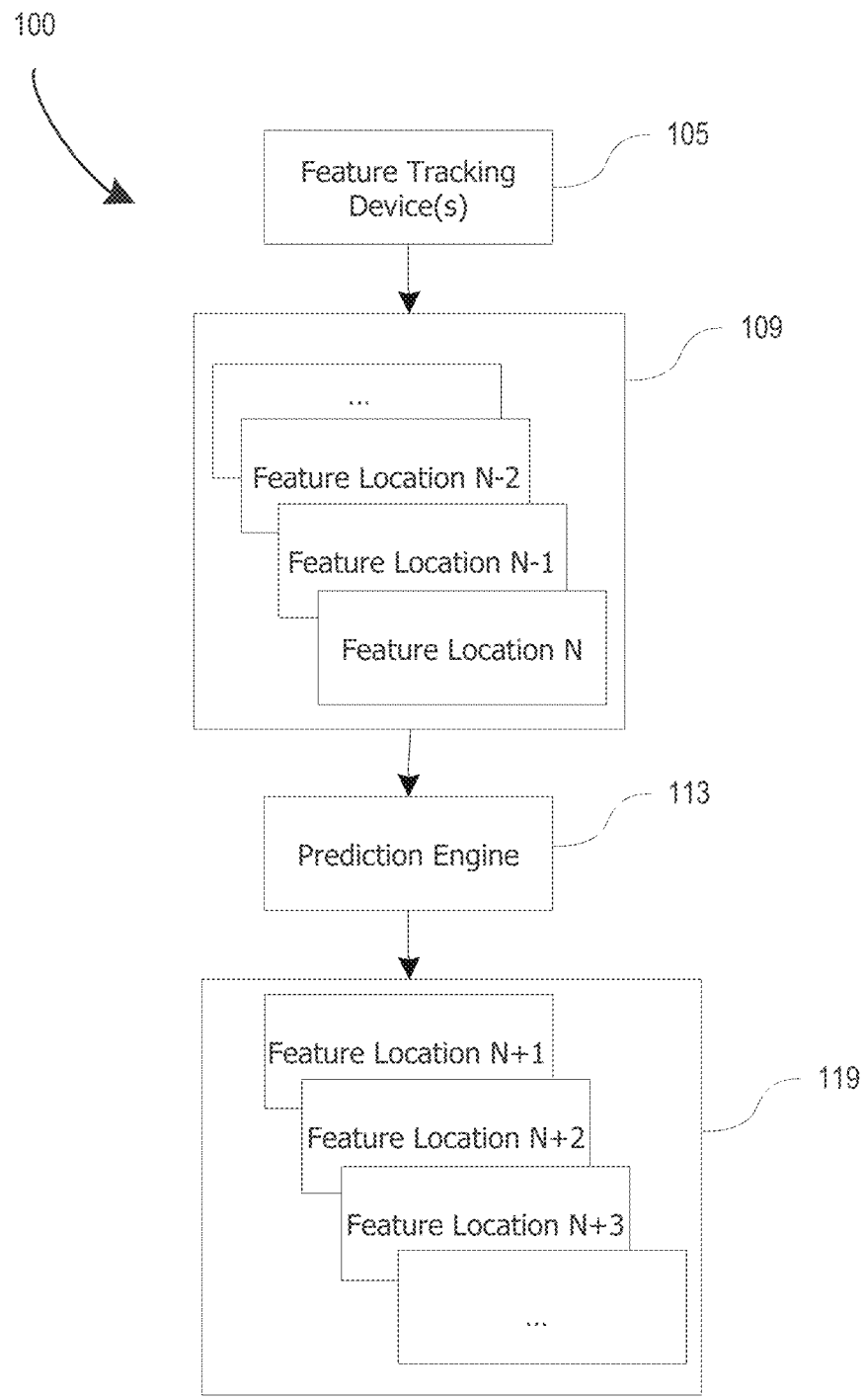
FIG. 1 is a schematic representation of a predicted feature location calculated using a predictive feature tracking process based on previously acquired feature locations, according to one embodiment.

Elements in the several figures are illustrated for simplicity and clarity and have not necessarily been drawn to scale. For example, the dimensions of some of the elements in the figures may be emphasised relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the systems and methods disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as 'configured to' perform one or more functions or 'configured for' such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of 'at least one of X, Y, and Z' and 'one or more of X, Y and Z' may be construed as X only, Y only, Z only, or any combination of two or more items X, Y, and Z (e.g., XYZ, XY, YZ, ZZ, and the like). Similar logic may be applied for two or more items in any occurrence of 'at least one . . . ' and 'one or more . . . ' language.

Unless defined otherwise, all technical and scientific terms used herein have the same meaning as commonly understood by one of ordinary skill in the art to which this invention belongs.

Throughout the specification and claims, the following terms take the meanings explicitly associated herein, unless the context clearly dictates otherwise. The phrase 'in one of the embodiments' or 'in at least one of the various embodiments' as used herein does not necessarily refer to the same embodiment, though it may. Furthermore, the phrase 'in another embodiment' or 'in some embodiments' as used herein does not necessarily refer to a different embodiment, although it may. Thus, as described below, various embodiments may be readily combined, without departing from the scope or spirit of the innovations disclosed herein.

In addition, as used herein, the term 'or' is an inclusive 'or' operator, and is equivalent to the term 'and/or,' unless the context clearly dictates otherwise. The term 'based on' is not exclusive and allows for being based on additional factors not described, unless the context clearly dictates otherwise. In addition, throughout the specification, the meaning of 'a,' 'an,' and 'the' include plural references. The meaning of 'in' includes 'in' and 'on.'

As used in the specification and claims, the singular forms 'a', 'an' and 'the' include plural references unless the context clearly dictates otherwise.

The term 'comprising' as used herein will be understood to mean that the list following is non-exhaustive and may or may not include any other additional suitable items, for example one or more further feature(s), component(s) and/or element(s) as appropriate.

Unlike visual content provided by traditional display systems (e.g. 2D display screens, monitors, televisions, dashboard displays, projectors, projection screens, and the like), light field content (e.g. a light field image(s), video, or the like) rendered via a light field display is optimally or most effectively viewed or experienced in a defined region(s) of viewing space. Such a spatially defined region(s) for optimal viewing is herein referred to as a view zone, or a viewing zone. Such view zones typically have a characteristic 3D geometry and position in 3D space depending on, for instance, the geometry and configuration of light field shaping elements (LFSEs) used to govern light emitted from pixels of a display screen, the particular rendering pattern of content on the display screen, and geometric considerations of the light field system components and their relative disposition with respect to the view zone ultimately defined.

For light field content generation, specific pixels of a display screen are activated, and light emitted therefrom is shaped and directed by LFSEs to project light field content within the view zone. The selection of pixels to activate for visual content presentation is typically performed in accordance with one or more ray tracing processes that consider various geometrical parameters, including the desired position in 3D space in which content is to be viewed (i.e. the viewing zone location or viewing zone geometry). That is, for a given desired viewing zone position (e.g. at the 3D position of an eye of the user relative to a light field display), a ray tracing process may digitally compute a rendering pattern of pixels on a display screen such that, once isotropically emitted from specific pixels and guided/governed by LFSEs, light will project into the view zone to produce perceivable visual light field content. Should a desired viewing zone position change or update, such as if a user or user eye were to move, a similar process may be applied to update the rendered pattern on the display screen to correspondingly project light field content in accordance with this updated viewing zone location/geometry.

While such aspects of light field technology are known in the art, it is worth noting these aspects are in stark contrast with conventional aspects of traditional 2D displays, wherein light is emitted isotropically from pixels of a display, and there is no consideration of the position from which content will be viewed when rendering content via the screen. Accordingly, the provision of light field content, and the systems and processes associated therewith, require consideration of various aspects that have no analogy in conventional display systems.

For example, a light field display comprises various optical layers (e.g. a light field shaping layer, or LFSL, comprising LFSEs, such as microlenses, pinhole arrays, or the like) to direct and shape isotropically propagating light. A light field system further performs a large number of computations in order to render content to be perceived. For example, light field content rendering may comprise the execution of three-dimensional ray tracing calculations in which rays are traced between the view zone location, such as the pupil(s) of user, and individual pixels of a display screen, in consideration of intervening optical elements (e.g. the refractive properties and/or positions of LFSEs) to determine which pixels are to be activated to provide light field content within a designated region of space. Such aspects, while potentially computationally expensive, enable various features or advantages inaccessible to traditional display systems, such as the provision of visual content that can be perceived as three-dimensional.

Moreover, and in accordance with various embodiments, light field content may be provided in accordance with various perception adjustments, a non-limiting example of which includes the presentation of light field content that corrects for a user's reduced visual acuity. That is, light field content may be provided within view zones as an image or video that may be 'correctly' perceived by an unaided user who would otherwise only be able to properly view traditional content if wearing prescription glasses or contact lenses. Such and similar applications, systems, and methods are further described in, for instance, Applicant's U.S. Pat. No. 10,394,322, Applicant's co-pending U.S. patent application Ser. Nos. 16/510,673, 16/569,137, and 16/551,572, the entire contents of each of which are hereby incorporated herein by reference.

As light field content is more optimally perceived in spatially defined regions of space (i.e. viewing zones), one aspect of consideration for light field systems is the location of the pupil(s) or eye(s) of one or more users of the system. That is, in order to provide light field content in a manner conducive to a positive user experience, it may be preferred to render content via a light field display in accordance with a view zone geometry that encompasses the eye(s) of a user. As such, and in accordance with some of the embodiments herein described, user feature location tracking or prediction (e.g. tracking or predicting the location of a user pupil(s), eye(s), facial landmark(s), or the like) can play an important role in user experience of light field display systems.

For many light field applications, however, it may further be of importance to provide light field content in a manner that is adaptable to user movement, while continuing to provide a comfortable viewing experience for users. For example, light field systems may employ eye tracking technology to acquire pupil locations, and update in real time a view zone geometry in response thereto, thereby attempting to, in real time, continuously render content in accordance with a view zone geometry that encompasses the eye(s) of the user. However, such aspects have been challenging to execute with a high degree of user satisfaction, as the computational demand of continuously updating a viewing zone geometry and projecting content in accordance with computationally demanding ray tracing calculations often leads to various issues and visual artefacts, such as lags in content presentation and/or image jitteriness. Moreover, acquired pupil location data may be noisy, due to real pupil movement and/or measurement error. For example, raw feature position data acquired by a tracker may naturally be characterised by noise arising as a result of estimation methods and computational processes often utilised by tracking systems. This may result in often unnecessary and unpleasantly perceptible re-rendering of content for projection in a new view zone location, resulting in a jitteriness or instability of perceived content, and a reduced quality of user experience.

In part to this end, the systems and methods described herein provide, in accordance with different embodiments, different examples of systems and methods for improving a perceptive experience of light field content projected via a light field display based on a real-time and/or predicted user location and/or movement. Various embodiments herein described mitigate negative effects of conventional light field systems employing pupil trackers for real-time and continuous updating of view zone geometries in which to present light field content. Such conventional systems often overtax processing resources by, often unnecessarily, attempting to indiscriminately update rendered content in response continuously or near-continuously acquired pupil locations, leading to lags in rendering, and perception of unstable or jittery light field content.

Various embodiments herein described, on the other hand, may apply predictive or discriminatory techniques based on acquired pupil locations and derived pupil velocity/trajectory considerations that can result in a significantly improved viewer experience, whereby a relatively fixated gaze can be recognised by virtue of reduced pupil velocities or likewise recognisable fixated pupil location dynamics (e.g. constrained trajectory, limited displacement amplitudes, recognisable behavioural pupil dynamics for a particular activity such as reading, etc.), thus invoking a 'fixed' or 'fixated' (and/or pre- and/or post-fixated) viewing mode or state in which an image rendering geometry is not as often updated in response to an acquired pupil location, thus significantly reducing potentially perceived image jitteriness and/or stability.

Comparatively, where captured pupil or user feature locations are suggestive of significant displacements, the pupil tracking system and correlated image rendering process can migrate to a 'dynamic' or 'moving' mode or state, in accordance with some embodiment. In such a state, image rendering dynamics and geometries may be more rapidly updated to accommodate such movement. In accordance with yet other embodiments, recognition of a dynamic state of a user, user feature, and/or pupil may conversely result in a pause of content rendering, whereby a return to a fixed user state after observation of a dynamic state may initiate a re-rendering of content. In such embodiments, a stable viewing zone geometry in which light field content is projected is provided upon recognition of a relatively fixed user state, thereby providing stable content rendering that in turn reduces the perception of jitter and improves user experience.

That is, different embodiments herein described relate to the provision of different light field viewing modes and schemes which, in comparison to conventional light field display systems and methods that indiscriminately update view zone geometries and thus the rendering of light field content, present light field content based on observed user dynamics based on the particular light field application at hand. For example, various embodiments relate to the determination of a velocity threshold to discriminate between relatively fixed and relatively dynamic user states. In accordance with some embodiments, a light field applications may benefit from maintaining a light field viewing zone geometry for projecting content therein during a fixed state (i.e. when observed or estimated movement is below the velocity threshold), thereby minimising undue digital processing and providing stable light field content in a fixed viewing zone, and updating light field rendering during dynamic states. For other light field applications, it may be beneficial to instead provide a stable light field viewing geometry during both relatively static/fixed states as well as during dynamic states (i.e. when a user appears to be moving), and to update light field viewing zone geometries and therefore rendered light field content only once it is observed or estimated that the user has returned to a relatively fixed or static state, in a new position.

It will be appreciated that, in accordance with different embodiments, estimates of a desired view zone geometry or location may be achieved at least in part using various pupil trackers, eye trackers, and/or facial recognition systems. For example, some applications may benefit from an accurate estimate of pupil location in real time to inform decisions of user state (e.g. static or dynamic) or gaze direction, and/or to predict a future pupil or eye location. However, it will be appreciated that various embodiments may additionally or alternatively relate to estimating a desired view zone location based on aspects that are not direct measurements of a user pupil position. For example, while a user may perceive content via the pupil, some embodiments benefit from projecting content in accordance with a view zone location corresponding to a central region of the eye (e.g. near a pupil), or a position corresponding to where the pupil would be if the user were directly looking at a light field display, or an area or volume centred around an approximate pupil location but is sufficiently large to completely encompass the pupil, or the like, rather than to direct content towards a physically measured pupil position.

For example, some embodiments relate to applications where the attempt to provide continuous presentation of content to the user pupil is not necessary, or may even reduce user experience (e.g. due to inadvertent or reflexive pupil movement that is not related general user movement). For instance, a driver of a car may gaze at a dashboard light field display (e.g. to consult a GPS map or the like) only intermittently, while spending the vast majority of the time gazing at the road ahead. In such a case, it may be that the user remains generally motionless (e.g. may keep their head still), while moving only their eyes between the display and other locations. Further, a user may shift their gaze across a light field display when in use (e.g. for reading content across the screen, or the like) which, in direct pupil tracking systems, may register as dynamic motion, triggering an update in projected content within an updated view zone. In such cases, however, a light field display may not benefit from continuously update rendering geometries based on pupil positions, but rather may beneficially maintain projection of light field content within a view zone encompassing the region of space where the user's pupils would be looking was the user intending to look at the display. For these and other applications, a light field system or method may benefit from a reference point that is more stable than the user's pupils, or does not trigger updated content during normal static use. For example, and without limitation, a preferred user feature may comprise the general position of the eye(s), the centre of the user's palpebral fissure, or the like, to define a view zone geometry in accordance with which light field content is to be presented.

Accordingly, it will be appreciated that various embodiments may utilise various points of reference with which to define a view zone. That is, while various embodiments described herein may reference 'pupil positions' or 'pupil locations', it will be appreciated that such embodiments may additionally or alternatively relate to the positions or locations of other features that may be applied to deduce a probably pupil location. For example, and without limitation, various embodiments relate to the use of facial recognition or facial tracking systems or methods to establish various points of reference on a user's face (i.e. facial landmarks). Such points may, in accordance with some embodiments, be indicative or representative of where a user's pupils would be, was the user be looking at the display, or such points may be used to infer or approximate the same. Further, various embodiments may relate to the use of such facial landmarks to infer a spatial position that does not correspond to any particular user-related feature (e.g. a pupil), but may correspond to a location in space that corresponds to a suitable or desirable point in space for defining a view zone, a non-limiting example of which is the geometric centre or like metric associated with the palpebral fissure, in cases where a view zone defined around the same may naturally encompass a user pupil to enable perception of light field.

Accordingly, it will be appreciated that, as used herein, the term 'user feature' may be understood to refer to or be used interchangeably with a trackable feature of the user, and may comprise, without limitation, any one or more of a user pupil, facial landmark, eye, head, mouth, or the like, or a reference point relative thereto, unless the context clearly dictates otherwise. For example, with respect to user perception, it will be understood that a pupil, rather than an arbitrary facial landmark (e.g. the mouth), must be encompassed within a viewing zone to enable optimal perception of presented light field content. However, a pupil need not be explicitly tracked to enable definition of a view zone operable to enable user perception via the pupil. For exemplary purposes, only, one may consider that, with accurate positional knowledge of user features comprising the left and right 'corners' of the palpebral fissure, one may estimate the approximate position of the user's pupil when looking at a light field display to perceive content provided thereby. Accordingly, in the context of ascertaining an appropriate location at which to define a viewing zone, one may track any one or more user features that may be used to infer a view zone position that will enable perception of content by the user, typically via the pupil. Similarly, a 'feature centre', in the context of determining an appropriate viewing zone geometry or in the context of user tracking, may be understood to refer not only to a pupil centre, but may additionally or alternatively refer to a position that is approximately the centre of a different feature (e.g. the eye, the palpebral fissure, or the like), or a location corresponding the centre of an area or volume in space in which it is desired that a view zone be defined, such as where the pupil is located, or is predicted to be located, in accordance with various embodiments.

In some of the herein-described embodiments, a user feature tracking system (e.g. pupil tracker, facial landmark detector, or the like) and/or method is implemented to provide adaptive image corrections or adjustments in a light field display system or device, whereby acquisition of a temporally and spatially accurate user feature location(s), in two or three-dimensions, is important in the delivery of a positive user experience. For example, certain embodiments involve the provision of corrective image rendering through light field shaping optics so to correct for a user's reduced visual acuity. An exemplary application for the herein-described embodiments is also described in Applicant's U.S. Pat. No. 10,394,322, Applicant's co-pending U.S. patent application Ser. Nos. 16/510,673, 16/569,137, and 16/551,572, the entire contents of each of which are hereby incorporated herein by reference. An example drawn therefrom is also described below, in accordance with one embodiment. In such embodiments, high user feature location accuracy may be appreciated to ensure that desired image corrections are adequately generated while minimising the production of optical artefacts that may otherwise be distracting to the viewer.

Given the high spatial resolution considered to implement such corrections, a high temporal sensitivity can also be addressed as slight displacements in the viewer's pupils or user features may bring forth significant changes in ray tracing, or like vision correction computations, applied to compute the various optical views provided through the light field display and its impact on image correction and focused image rendering. As the viewer's eyes can readily perceive fluctuations within a temporal range of a few dozen milliseconds, a temporal pupil tracking resolution may be required in this order, in some embodiments, to ensure a quality user experience. Namely, pupil tracking outputs may be preferred on timescales similar to, or in the order of, an image refresh rate, so to ensure that appropriate image rendering is provided to provide the desired visual compensation without introducing adverse visual effects or delays.

Conversely, and in accordance with some embodiments, where pupil displacements or user features are tracked and/or predicted to remain within a relatively confined viewing zone, for example as prescribed or bounded by display hardware, optics and/or viewer positioning, a rendering geometry of the light field display may be maintained so not to overly refresh, for example, ray tracing and/or view zone pixel allocations, thereby reducing or minimising perceived image rendering jitteriness that could otherwise be perceived due to an oversensitive pupil tracking and image rendering system, as described above. Indeed, a viewer identifiable as being within a fixated or static view configuration (i.e. where pupil displacements are predictively contained within or reasonably around a designated view zone, eye box, or the like), may ultimately have a better viewing experience if image rendering dynamics/geometries are not as frequently updated, for instance, favouring image rendering stability over spatial accuracy. A highly spatially and temporally sensitive system may nonetheless be preferred where the viewer's fixated mode migrates to a moving mode, in which pupil tracking and rendering accuracy and precision may be of greater importance to an effective viewer experience.

Given the temporal constraints and considerations noted above, predictive user feature and/or pupil tracking can be implemented, in accordance with some of the herein-described embodiments, to mitigate delayed optical effects (e.g. lags in rendering) that may impact a viewer's experience and consequently provide for a better overall user experience, while also or alternatively mitigating jittery optical/image rendering effects that may be perceived when a viewer is otherwise mostly in a static or fixated viewing state.

For example, various embodiments relate to the use of one or more previously acquired user feature locations to generate and predict one or more future feature locations, compute an average or current user feature displacement velocity and/or trajectory, or other user feature displacement dynamics, as may be relevant to the application at hand. In doing so, in accordance with some embodiments or applications, a corresponding rendering of a perceived content that relies at least in part on feature tracking inputs can now take into account not only one or more of a current, past and/or future predicted pupil location and/or gaze direction, but also a past, current and/or future predicted user feature location trajectory and/or velocity, which can ultimately result in providing an increase in the effective rate of feature tracking (and related image re-rendering), a reduction in re-rendering jitteriness for predictively fixated (and/or pre- and/or post-fixated) user feature dynamics despite ongoing feature movement capture, and/or other like rendering dynamic improvements.

For example, in some such embodiments, a digital display device and digital image rendering system and method are provided that rely, at least in part, on user feature tracking to adjust an output image. For example, an image to be displayed can be adjusted, at least in part, as a function of a tracked user feature location. In accordance with some of the herein-described embodiments, an output image can therefore be adjusted not only as a function of an available user feature location, but also or alternatively as a function an acquired and/or predicted user feature location, trajectory and/or velocity, for example, where an image refresh rate is higher than a feature tracking rate, and/or to apply a variable rate to image re-rendering and/or to a rendering geometry adjustment mechanism applied to account for feature displacement (e.g. within a context of a light field display or like user-specific directional view generating display devices).

For instance, while existing gaze tracking applications rely on real-time pupil location acquisitions to monitor a user's gaze direction in evaluating what is currently drawing their attention, such gaze tracking systems and methods are typically either insufficiently rapid or precise to support real-time applications requiring high resolution and high accuracy pupil location tracking. For example, the trade-off for operating real-time gaze trackers (e.g. trackers operating on a timescale in the order of roughly 100 ms) is generally a low spatial accuracy, which may nonetheless suffice to monitor a general user gaze direction, whereas higher accuracy solutions will typically be much slower. Accordingly, current solutions are not generally amenable to address applications where both a higher temporal resolution and spatial accuracy may be required, such as where current gaze tracking solutions would generate prohibitive lag times and/or adversely impact a user experience. Furthermore, while predictive eye tracking can result in increased tracking and corresponding image rendering rates for improved spatial image rendering geometry accuracy, predictive eye tracking techniques as described herein may also allow for such high precision, high accuracy pupil-specific image rendering processes to accommodate different view modes, for example, to dynamically adjust pupil displacement impacts on image rendering based on acquired and predicted pupil dynamics, such as when a viewer alternates between moving and fixated view periods, as will be described in greater detail below.

The following will provide different examples of user feature tracking and correlated light field content rendering techniques that rely on acquired and/or predicted user feature locations, velocities and/or trajectories to improve a user experience, as introduced above. It will be appreciated that while some of the embodiments herein described may be applied within the context of gaze tracking applications, various embodiments generally relate to user feature tracking applications, such as facial landmark and/or pupil tracking, for the presentation of light field content in a spatial region defined relative thereto, and not necessarily to the computation or estimation of gaze direction therefrom.

That is, various embodiments for presenting light field content may be agnostic to the determination a user gaze direction, and rather relate to the estimation of an eye position or relative pupil position with respect thereto based on the position of other user features, such as facial landmarks related to the palpebral fissure. The position of such features may not necessarily change position as the user's gaze direction is altered through corresponding pupil movement. Accordingly, some embodiments do not necessarily invoke various processes associated with conventional gaze trackers, such as those seeking to discern user intent through analysis of gaze fixation and like oculomotor processes. It will thus be appreciated by the skilled artisan that various aspects related to such conventional gaze estimation systems, while considered within some application-specific downstream contexts of some embodiments herein described, are not analogous to the aspects herein considered in the context of presenting light field content. For example, some conventional gaze tracking applications seek to filter noise and/or rapid changes in gaze direction data arising from involuntary eye movement (e.g. microsaccades) to improve estimation of intended user gaze position and/or behaviour. This skilled artisan will appreciate that such digital filtration has no analogue in, for instance, rendering light field content in accordance with a maintained viewing zone geometry based on observed user feature dynamics.

With reference to FIG. 1, and in accordance with one exemplary embodiment, a predictive feature tracking system, generally referred to using the numeral 100, will now be described. In the illustrated embodiment of FIG. 1, the system 100 relies on one or more feature tracking devices or systems 105 to output a current feature location, such as a pupil tracker, face tracker, facial recognition system for determining facial landmark positions, or the like. These may include, without limitation, any system using corneoscleral reflections (i.e. glints) on the user's eye, from one or more IR or near-IR light sources or the like (for either bright and/or dark pupil tracking); or computer vision-based methods using feature recognition applied to an image of the user's face obtained via a digital camera of the like.

Note that different devices using different technologies may be used in combination, for example, to leverage computation efficiencies in tracking and/or monitoring a user's eye and/or pupil location in different environments, and/or to provide metrics by which system accuracies can be evaluated, and different approaches weighted accordingly to provide higher overall system accuracies. Furthermore, different techniques may be implemented, for example, to reduce overall system power consumption, computational load, reduce hardware load requirements and/or reduce the viewer's exposure to various light probes (e.g. IR, Near-IR probes) typically used in glint-based pupil locating processes. For example, machine vision implementations may be relied upon at a first level to adequately locate and track facial features such as the user's eyes, eye features or points of interest, pupils and/or pupil centres, whereas higher-resolution glint-based techniques may be layered thereon (e.g. via IR/NIR illumination) to refine and/or confirm machine vision results at a lower frequency, thus reducing IR/NIR emissions which may be unfavourable in certain conditions but may otherwise be required in other low lighting conditions. Similarly, different spatial estimation techniques may be applied to, again, reduce computational load by, for example, estimating pupil centre locations or feature centre locations using machine vision techniques or calculations by predominantly tracking eye or other facial feature locations (which may be generally easier to track) and confirming pupil locations and/or centres at lower refresh rates. These and other techniques may be considered herein without departing from the general scope and nature of the present disclosure.

With continued reference to FIG. 1, generally, device(s) 105 is(are) operable to provide a sequence of feature location data 109 (e.g. pupil centre positional data 109) of a user (e.g. 3D position of the pupil centre) in real-time or near real-time. For instance, where different techniques are used to compute pupil centre locations 109, these different outputs may be combined, averaged and/or otherwise statistically compiled to produce pupil centre location information useable in subsequent steps. For example, in some embodiments, a machine-vision based approach may be used to first estimate a location of the pupils. This estimation may rely on various facial feature identification and/or extraction techniques, for example, but not limited to, by searching for and/or identifying the curvature of the eye(s), the dark pupil centres in contract with the sclera, etc., in combination, for example, with one or more glint-based techniques that, for example, may be constrained to previously machine-identified eye/pupil regions and/or be used a confirmation, validation or recalibration of such techniques. In some examples, past pupil locations may not only be used, directly or indirectly through one or more encoded variations or transformations thereof, to output predictive pupil location information, but also to seed pupil location measurements, for example, in the context of a machine vision pupil search algorithm or the like.

With continued reference to FIG. 1, the system 100 uses, at least in part, data 109 as an input to a Prediction Engine 113 configured to analyse and generate therefrom one or more temporally predictive feature locations 119 (e.g. pupil locations 119) based on characteristic patterns automatically derived and interpreted from input data 109. For instance, one or more predictive data modeling techniques may be used by Prediction Engine 113 to extract one or more parameters representative of monitored real-time feature location variation, and generate or construct therefrom a mathematical representation or model operable to output predictive feature locations 119. Some of these techniques will be discussed below, without limitation.

In some embodiments, one or more temporally predictive modeling methods (statistical or otherwise) can be used by Prediction Engine 113 to generate a predictive feature location sequence 119 (e.g. pupil location sequence 119). These may include, but are not limited to: moving averages, exponential smoothing, linear and/or non-linear regressions, spline interpolation, extrapolation, Box-Jenkins forecasting methods, Kalman Filters, alpha-beta filters, non-parametric models such as Gaussian Process Models, and/or neural networks (including convolutional, recurrent or recursive neural networks). Other filters may also or alternatively include a weighted median filter, or the like. Generally, any amount of previously generated feature location data, and/or data derived therefrom (e.g. velocity, acceleration, displacement trends or patterns, etc.) may be used in the estimation or extrapolation of the pupil centre of feature location to produce predictably reliable results. In some cases, a trajectory model (e.g. probable pupil location as a function time) from past data points may be extrapolated or projected beyond the last data point (pupil centre location) to obtain an estimated trajectory (as a function of time) of (probable) future feature locations. Moreover, any number of estimated locations may be generated from the estimated trajectory while waiting for the next true feature location (e.g. pupil centre, palpebral fissure centre, or the like) measurement, which can then be relied upon to refine the estimated trajectory and iteratively apply appropriate correction thereto to output ongoing predictive feature location data. As noted above, while a predicted future feature location may be used to predictively induce a corresponding image rendering process (e.g. to predictively output an appropriate image rendering geometry and/or perspective), acquired feature tracking data may also or otherwise be used to compute a current or predicted feature trajectory, and/or again consider a current or average feature velocity, so to effectively predict the likelihood that the feature (e.g. the viewer's pupil) will sufficiently move within a forecasted time period to warrant impacting/adjusting current image rendering parameters.

In some embodiments, each feature location obtained from the pupil tracking device or system 105 may also comprise measurement errors associated therewith. These errors, if present, may be used by Prediction Engine 113 when generating the estimated feature sequence 113. The methods for incorporating such measurement errors in the modelling methods described above are well known in the art.

Figure 2A:
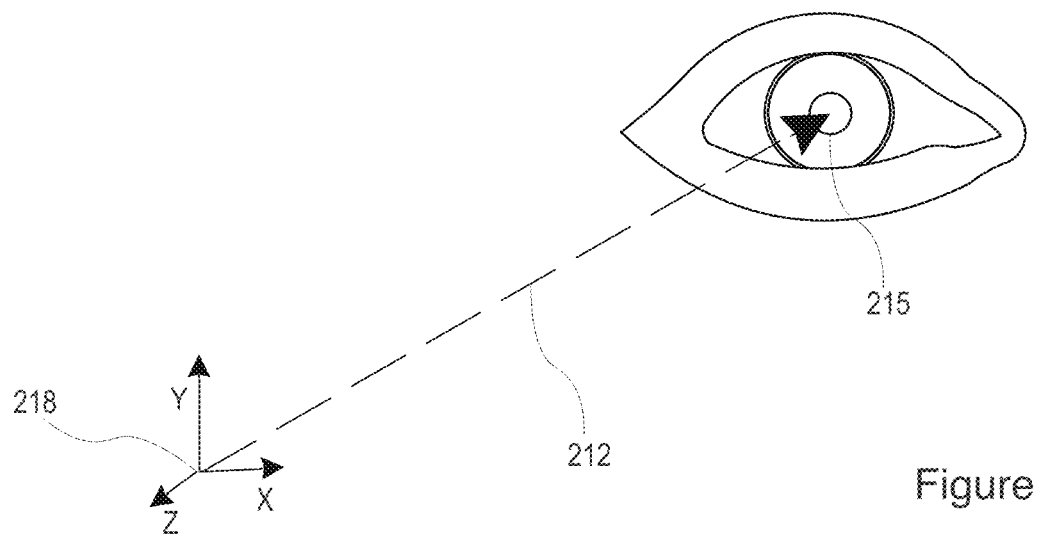
FIG. 2A is schematic representation of a pupil location in three-dimensional space, according to one embodiment.

As shown in FIG. 2A, and in accordance with one embodiment, a feature location may comprise the three-dimensional position 212 of the pupil centre 215 measured from a reference point 218. While the pupil moves slightly within the eye depending on where a user is focusing his/her gaze, the head and body of the user itself may move as well. Within the context of a vision correction application, or other 3D light field image perception adjustment applications, the pupil location in three dimensional space is generally set relative to a location of a light field display screen such that, in some embodiments, appropriate ray tracing processes can be implemented to at least partially govern how light emanated from each display pixel (of interest) is appropriately channeled through a corresponding light field shaping layer and relayed to the viewer's pupil. Naturally, as a viewer's pupil location changes relative to the display, so will corrective or otherwise adjusted pixel data change to adjust the output pixelated image accordingly. Accordingly, the light field display will generally include, or be associated with, related pupil tracking hardware such as one or more light sources (e.g. IR/NIR) and/or cameras (visible, IR, NIR) and related pupil tracking firmware/software. Further details in respect of one illustrative embodiment will be described below.

Figure 2B:
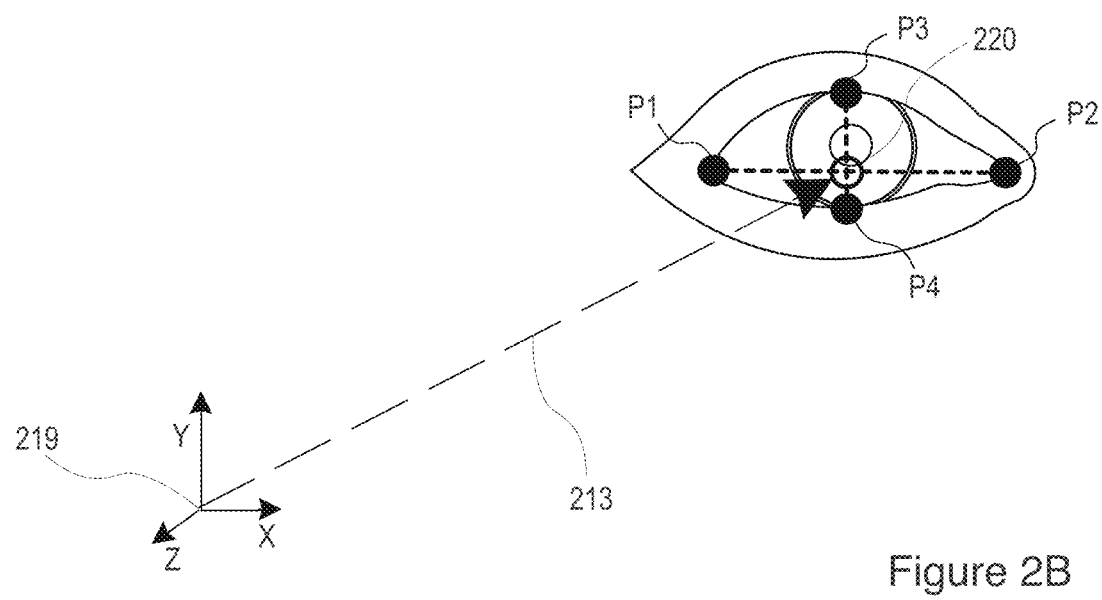
FIG. 2B is a schematic representation of an alternative feature location in three-dimensional space, in accordance with another embodiment.

In accordance with another embodiment, and as shown in FIG. 2B a feature location may comprise the three-dimensional position 213 of the intersection 220 of the palpebral fissure length (line P1-P2) and height (line P3-P4) measured from a reference point 219. In this non-limiting example of a user feature, the intersection 220 is calculated using the coordinate positions of the four facial landmarks P1 to P4 recorded for at each frame of data acquisition, wherein the intersection 220 is computed using the following exemplary equations for determining the intersection of two lines constructed from 2D point coordinates. However, it will be appreciated that similar approaches may be applied for data points in three dimensions. Represented in an algebraic notation, such a calculation may be characterised by:

$$\begin{bmatrix} a_1 & b_1 \\ a_2 & b_2 \end{bmatrix} \begin{bmatrix} x \\ y \end{bmatrix} = \begin{bmatrix} c_1 \\ c_2 \end{bmatrix}$$

such that, for each line, the value of a, b, and c corresponding to the equation of a line is computed as:

$$a_1 = y_2 - y_1$$

$$b_1 = x_2 - x_1$$

$$c_1 = a_1 x_1 + b_1 y_1$$

whereby $P1(x_1, y_1)$ and $P2(x_2, y_2)$ are the points characterising the line $a_1x + b_1y = c_1$ and $P3(x_3, y_3)$ and $P4(x_4, y_4)$ are the points characterising the line $a_2x + b_2y = c_2$, as schematically shown in FIG. 2B.

It will be appreciated that, in accordance with some embodiments, the use of such alternative points of reference or user features, such as the intersection 220 in FIG. 2B, may provide additional advantages over using, for instance, the pupil centre 215. For example, while the pupil may move slightly within the eye depending on where a user is focusing his/her gaze, very little motion may be exhibited by the head and body of the user, or the position of the intersection 220 associated with the palpebral fissure. Similarly, while a pupil tracker may be sensitive to small, rapid, and/or involuntary pupil movements, such as microsaccades, responding to such motions via re-rendering light field content in accordance with an updated viewing zone geometry may be generally detrimental to a user experience. That is, rather than to update a viewing zone geometry upon observation of a microsaccade, it may be preferred to maintain a light field viewing zone geometry in accordance with a previously observed user feature position to provide static and/or stable content. Accordingly, light field systems considering alternative points of reference to an instantaneous user pupil position may be subject to reduced unnecessary updating or re-rendering, thereby minimising excess processing and display refreshing, ultimately leading to an improved viewing experience for one or more users of the system (e.g. either the driver or a passenger of a vehicle). It will be appreciated that such embodiments may similarly relate to the applications, systems, and processes as described above with respect to FIG. 2A.

Figure 3:
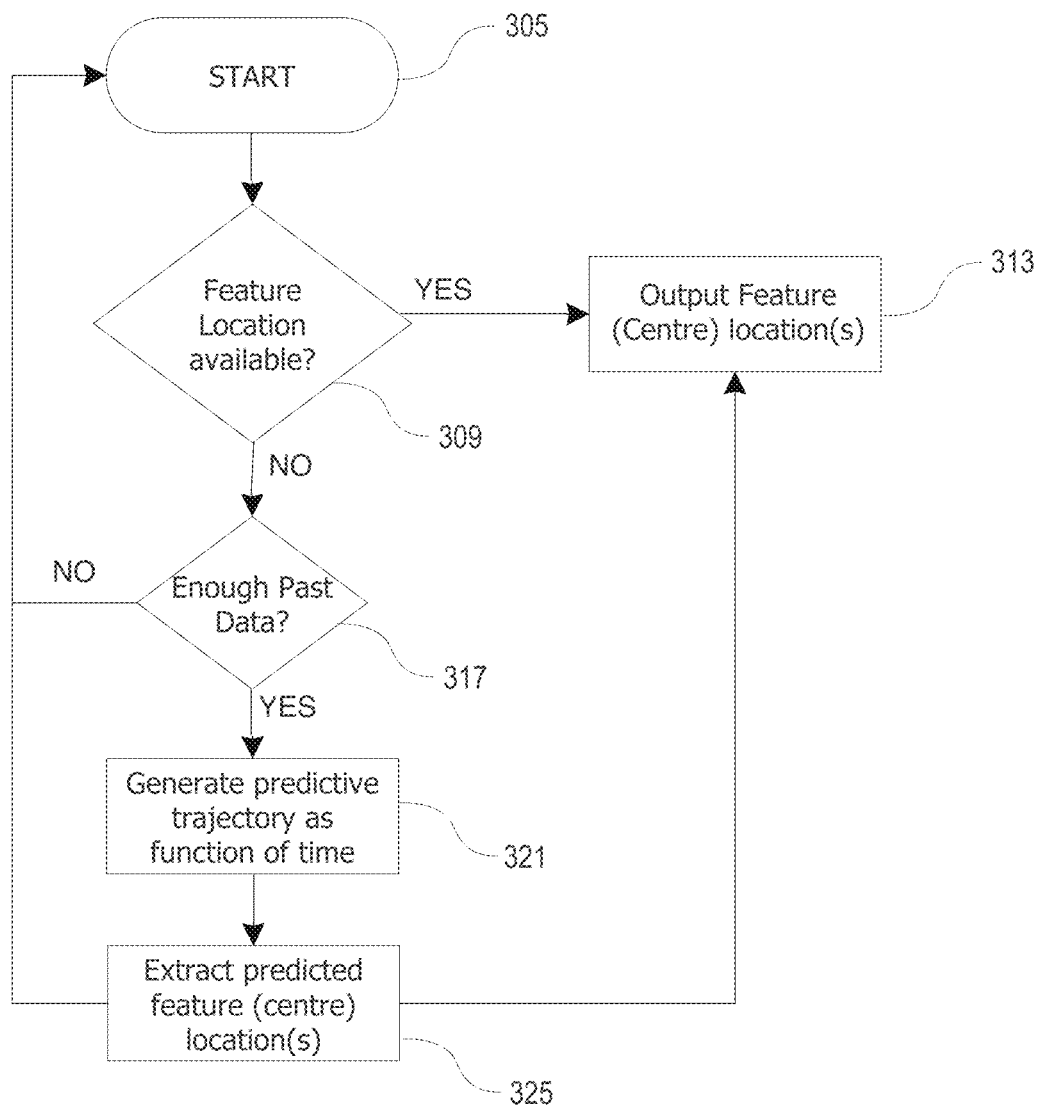
FIG. 3 is a process flow diagram of a predictive feature tracking method, according to one embodiment.

With reference now to FIG. 3, and in accordance with one exemplary embodiment, a predictive feature tracking method using system 100 described above, and generally referred to using the numeral 300, will now be described. The above-described system 100 uses a sequence of feature locations to generate predictive estimations of future feature locations. As noted above, it will be appreciated that other direct, derived or transformed feature location data may be used to this end. For simplicity, the following examples will focus on predictive trajectory models based on a time-ordered series of previously stored pupil locations.

The system described may thus be leveraged to complement or improve these pupil or feature tracking systems by generating one or more future feature locations while another system or device is waiting for the eye or pupil tracking systems to acquire/compute a new location. Thus, the methods described herein may provide for an improved frequency at which pupil locations are provided as output to another system or method. For instance, output of a current pupil location may be delayed due to processing load and/or lag times, resulting in the output, in some applications, of somewhat stale data that, for example, when processed within the context of highly sensitive light field rendering applications (that will invariably introduce their own computational lag), result in the provision of a reduced viewer experience.

Conversely, viewer experience may also or otherwise be adversely affected if pupil or other feature tracking systems perceive a user feature to have shifted, for instance through digitisation of user pupil positions, error in pupil location measurements, or minor spurious feature movements from an otherwise stationary user. Such a phenomenon may result in a re-rendering of an image or adjustment of an image rendering geometry, in a situation where user experience may be improved, for instance, by not adjusting pixel data at all. Namely, an image rendered with the intent of providing a designated image perception for a given input pupil location may be unsatisfactorily rendered for the viewer if the viewer's pupil or feature location changed significantly, or erroneously perceived to have changed, while image rendering computations were being implemented. Accordingly, computational lag times, combined with the generally high refresh rates required to provide an enjoyable viewer experience, may introduce undesirable effects given at times noticeable pupil location changes, or a light field display refreshes unnecessarily due to inaccurate instantaneous perception of movement. Using predictive feature location data in light field rendering applications, as considered herein, may thus mitigate issues common with the use of otherwise misleading feature location data.

Accordingly, the systems and methods described herein may be used to advantage in light field rendering methods or systems in which the user feature position (e.g. the pupil centre position, palpebral fissure centre, or the like) is used to generate a light field image via a light field display. Indeed, the predictive feature tracking method described herein, according to some embodiments, may make use of past feature positional data to improve the speed or frequency at which the feature position, which may be a moving target, is available to a light field ray tracing algorithm, or like light field rendering process.

As the light field rendering embodiments described above rely, in part, on having an accurate feature location, the speed or frequency at which the feature positional information is extracted by the feature tracker may become a bottleneck for a light field rendering process. For example, a 60 Hz digital display (that used by most phone displays) will have a refresh rate of about 15 ms, whereas higher frequency displays (e.g. 120 Hz displays) have much faster refresh rates, which can impose significant constraints on the computation and output of accurate feature tracking data, particularly when combined with computation loads involved in most light field rendering applications.

For instance, for an optimal light field output experience, a rendered light field should be refreshed at or around the display screen's refresh rate. This refresh rate should naturally align with a current location of the user's pupil at that time and thus, benefits from a predictive pupil tracking approach that can extrapolate, from current data, where the pupil will actually be when the screen next refreshes to render a new light field output. As described above, various other parameters may be used to infer or approximate the pupil position for such purposes. Regardless of the particular user feature tracked to project a light field within a view zone to be perceived by the user, a lack of temporal accuracy may otherwise lead to a reduced visual experience. Conversely, the importance of a high refresh rate for many applications in which a user is moving may unduly prioritise computational resources for image refreshing when a user is substantially stationary, or pupils are moving at low velocity, which, for at least the abovementioned reasons, may also adversely affect user experience. Available computational power may thus be leveraged instead to predict or estimate, based on previous known (e.g. measured) feature locations, an estimated future location of the feature, and selectively use this estimation to update the light field image, as appropriate, while waiting for the next true feature location measurement, thereby resulting in a smoother viewing experience.

Returning to FIG. 3, a feature location iterative refresh cycle is started at step 305. The method first checks at step 309 if, at this time, an actual measured feature location is available from the one or more feature tracking device or system 105. If this is the case, the method outputs the measured feature location at step 313. If this is not the case, then at step 317, the method checks to see if enough prior feature centre locations (as measured by one or more feature tracking device or system 105) have been recorded to provide enough data for prediction engine 113 to provide an accurate predicted one or more future feature locations. If this is not the case, then the method goes back to step 305. If enough data is available, then the method uses, at step 321, Prediction Engine 113 to generate the most probable trajectory (position as a function of time) of future feature locations. It may then, at step 325, extract one or more future feature locations from this trajectory, which are then fed back as output (step 313). The method loops back to step 305 once more. Therefore, the method as described above, may ensure that measured feature locations are outputted and used as soon as possible, while relying on Prediction Engine 113 to generate data points in between.

Similarly, predictive feature tracking data can be used to accommodate predefined light field rendering lags, for example, where a feature location is required early on in light field rendering computations (e.g. ray tracing) to output corrective or adaptive pixel data for rendering. Accordingly, rather than to compute ray traces, for example, on the basis of a current feature location output, such computations may rely on a predictive location so that, when the corrected or adjusted image is finally computed and ready for display, the user's pupil is most likely now located at the predicted location and thus in an ideal location to best view the rendered image. A predictive location may also be identified as one in which the image currently being displayed requires no further adjustment (i.e. the user's pupil is most likely already located in or around an ideal location to best view the rendered image), for example if the user pupil is stationary or moving slowly. In such a situation, light field rendering computations may be bypassed altogether for a time in favour of saving computational resources or improving user experience. These and other time lapse, lags and synchronisation considerations may readily apply, in accordance with different embodiments.

Figure 4:
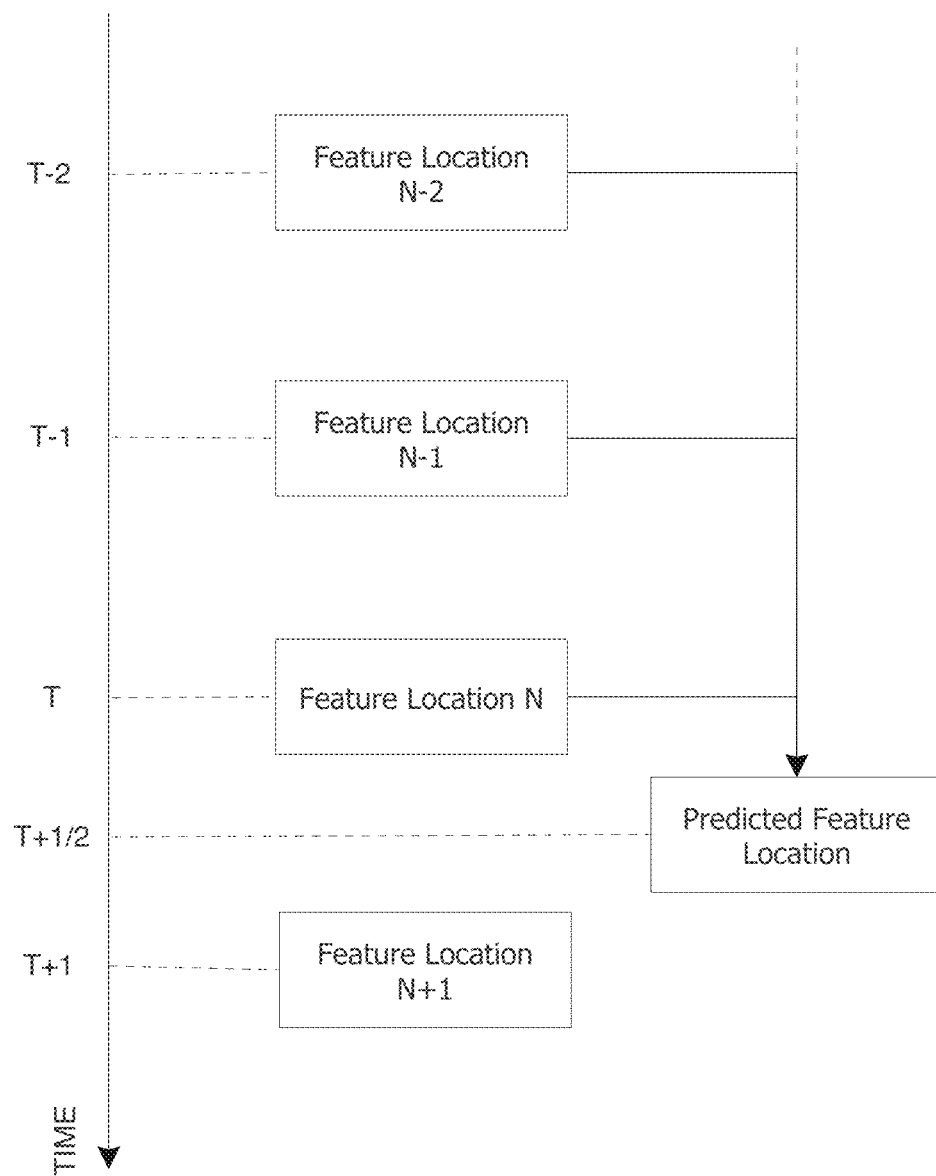
FIG. 4 is a schematic representation of an effective feature tracking frequency increased using a predictive pupil tracking process such as that shown in FIG. 3, according to one embodiment.

FIG. 4 is an exemplary schematic diagram relating a consecutive sequence of feature location measurements with a corresponding time sequence (by a single unit of time, for simplicity). Hence, the sequence from N to N+1 implies a time difference of one unit. Therefore, by using past feature locations (N, N−1, N−2, etc.) to generate a most probable future feature location at time T+½ (for example), the frequency at which pupil locations are available is effectively increased by a factor of two. Likewise, a predictable pupil location may be forecasted when addressing higher computation load processes.

Figure 5A:
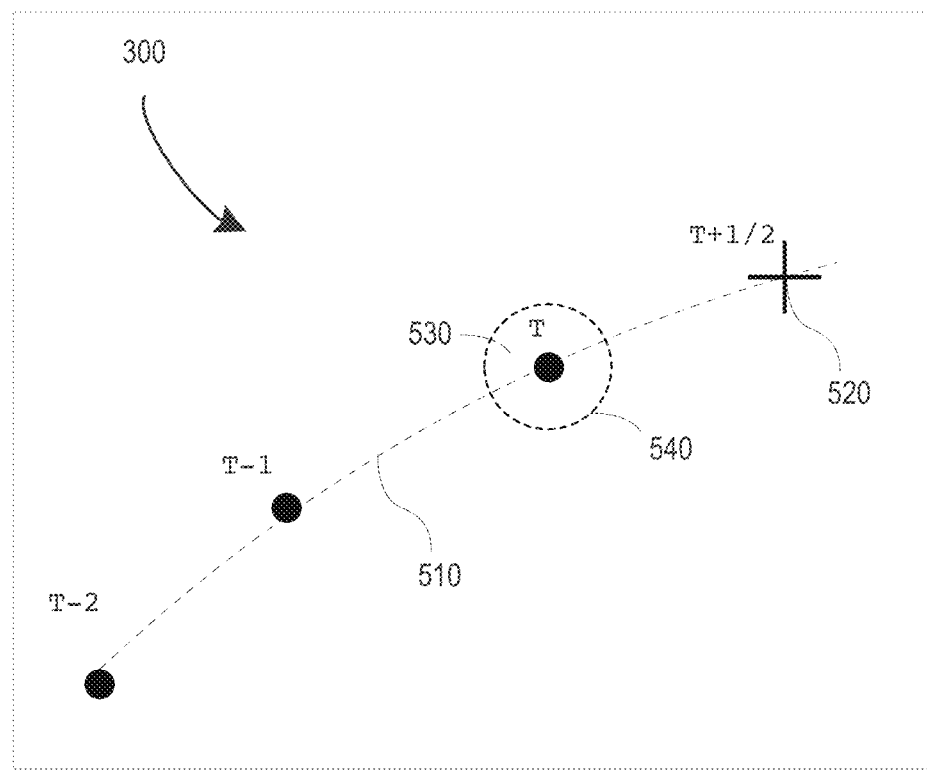
FIGS. 5A and 5B are schematic representations of acquired pupil location sequences and forecast pupil locations predicted therefrom, in accordance with at least one embodiment.

FIG. 5A shows the positional change corresponding to the time sequence illustrated in FIG. 4. The skilled technician will understand that the use of a 2D representation is only for demonstration purposes, and that an additional depth component may also normally be used, in accordance with various embodiments. Further, it will be appreciated that while the following description relates to tracking a user's pupil(s), that such description is provided for illustrative purposes, only, and that a feature(s) other than the user pupil may be tracked to deduce a user pupil location, and therefore a viewing zone defined relative or corresponding thereto. As explained above, each point (T−2, T−1 and T) represents a sequence of measured pupil centre locations, separated in time. At time T, while waiting for the next measurement (the result of which will be available at time T+1), previous measurements (N, N−1, and N−2 from times T, T−1 and T−2, in this example) may be used to generate an estimated trajectory 510 of probable future pupil location and extract therefrom an estimated future pupil location 520 at time T+½ (and thus an estimated future pupil position for perceiving light field content).

As described above, and as will be appreciated by the skilled artisan, gaze, feature, or pupil tracking comprises an important element of many light field display systems, such as those comprising an array of light field shaping elements (e.g. microlens arrays, apertures, and the like), which may produce the highest quality images within a specific region(s) of space, or a view zone. User experience may therefore be improved when an image is rendered taking into account a user pupil location or predicted location. Referencing again FIG. 5A, a light field image rendered at time T may therefore be optimally viewed within a view zone 530. A view zone geometry may be defined by the light field display components and/or light field shaping element sizes and/or geometries. One skilled in the art will therefore readily appreciate that while the view zone 530 is represented with a boundary 540 that is represented as circular in FIG. 5A, such a boundary may be hexagonal, rectangular, stretched hexagonal, etc., and is not limited to two dimensions. In this example, if the pupil location at time T is utilised to render an image for a moving viewer, who will then view the image at the pupil location at time T+½, the viewer may not receive a high-quality image at time T+½, as the pupil location may then lie outside of the view zone for which the image was optimally rendered. However, by estimating the trajectory 510 of the user's pupil over time (e.g. via tracking of the pupil or other feature providing information about the pupil location over time), a prediction engine, such as that described above as element 113 of FIG. 1, may, in accordance with at least one embodiment, estimate pupil location coordinates at time T+½ in order to project an image corresponding to a view zone that may encompass the predicted pupil location 520, thereby providing a more positive viewing experience.

Figure 5B:
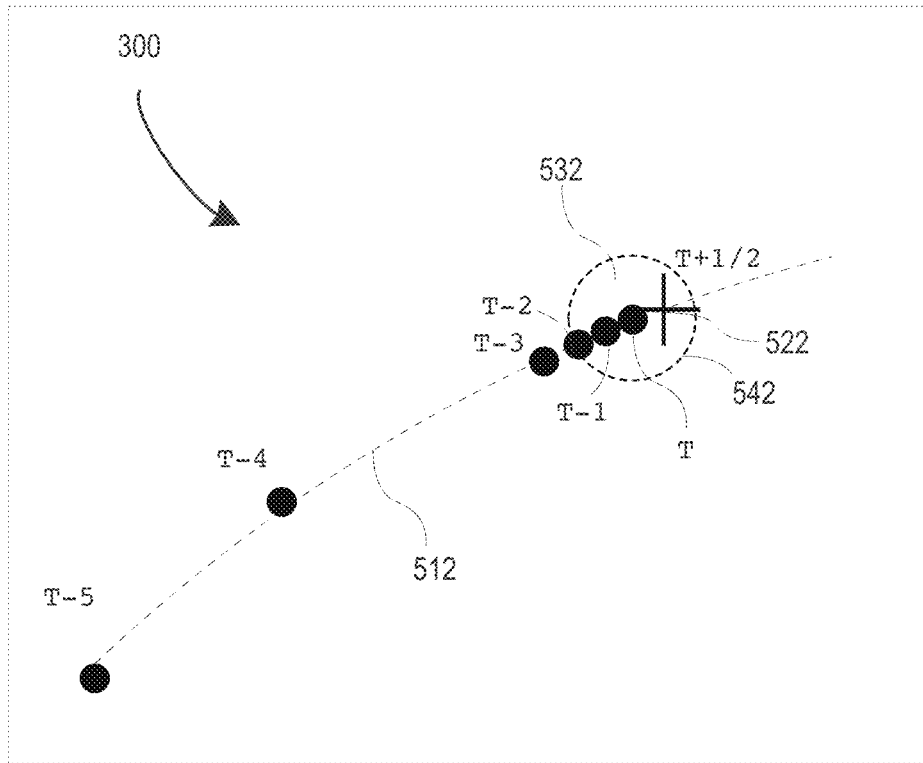

Similarly, FIG. 5B highlights yet another embodiment in which a prediction engine 113 may improve viewer experience. In this example, a user pupil location follows an initial trajectory similar to that shown in FIG. 5A, as denoted by the pupil locations, in order, T−5, T−4, and T−3. However, in this example, in contrast to that of FIG. 5A, a user pupil slows in its movement after T−3. In this example, the user pupil may be measured as having a trajectory and/or velocity small enough that its position 522 at time T+½ may still lie within a boundary 542 of the view zone 532 produced at time T. In this case, and in accordance with at least one embodiment, adjusting an image rendering geometry (e.g. geometrically re-allocating pixel values based on a distinctly computed optimal view zone) so re-render a digital image (e.g. for a static image) or impact rendering of future time-sequenced images (e.g. for a dynamic image) may not correspond to an improvement of user experience, but may even be detrimental thereto. For at least the reasons discussed above, it may be beneficial to therefore not refresh and/or re-render a display geometry in favour of providing a stable image geometry if a prediction engine 113 predicts a pupil location 522 that will not significantly deviate in space from previous recorded locations.

Accordingly, a prediction engine such as that depicted in FIG. 1, as herein described, may utilise a number of feature positions, pupil positions, and/or velocity data, or calculated values related thereto, to improve user experience. In accordance with at least one embodiment, it may be sufficient to measure or calculate a user feature velocity in order to predict that an image re-rendering may be unnecessary, if, for instance, a predicted pupil location is within an existing view zone. Such a prediction may be performed using said velocity, as well as optionally one or more of a view zone geometry, an image rendering rate, lag time, computational requirement, or the like. To simplify computation, and in accordance with at least one embodiment, a user feature threshold velocity may be provided as an input parameter such that view zone re-optimisation may be paused when it is determined that a pupil is moving with a relatively low velocity.

Figure 6A:
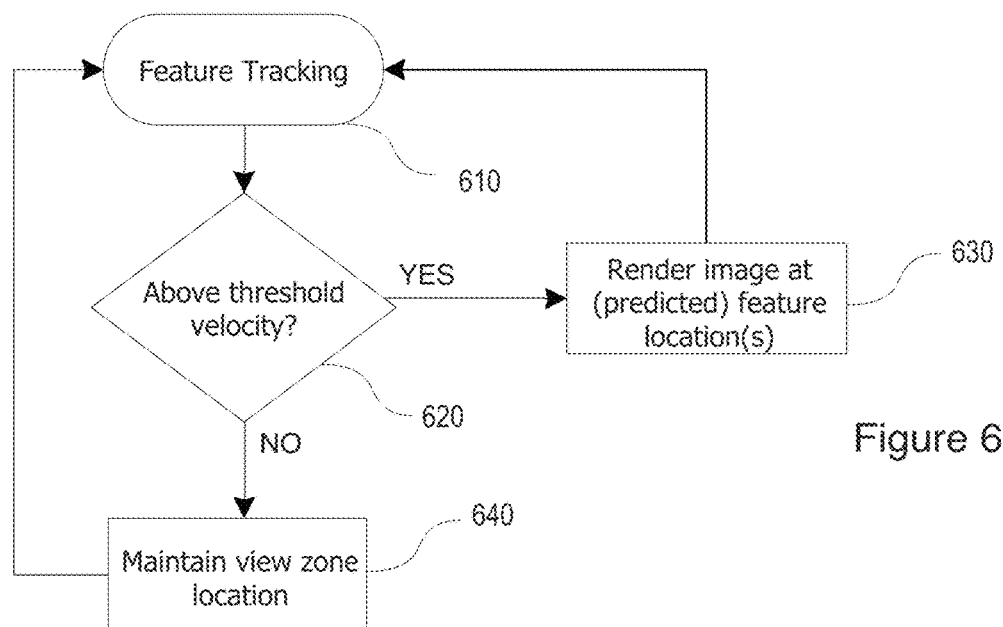
FIG. 6A is a process flow diagram illustrating an exemplary operational mode of a predictive feature tracking method, in accordance with at least one of the various embodiments.

FIG. 6A shows a schematic example of a predictive feature location process that may be employed to provide an image within a viewing zone for a user that is perceived as stable, in accordance with at least one embodiment. In this example, a feature tracker obtains a user feature location and/or motion at step 610, which may then be used to derive a pupil velocity. A processor and/or predictive engine may use this velocity to predict whether a pupil is moving sufficiently fast to warrant computing a new viewing window/zone location within which to render an image, and then perform further computations related to, for instance, ray tracing. The predictive engine may, in accordance with some of the various embodiments, compare the measured velocity to a designated threshold velocity at step 620. If the measured velocity is above the designated threshold, it may be deemed sufficiently high to render an image to be projected within a new view zone. In this case, the location of the new view zone and corresponding image(s) may be chosen to be at the location of the pupil at the time of the position and/or velocity measurement, or a predicted location based on a predicted trajectory, as described above. If the velocity is less than the designated threshold, it may be predicted that at a future time, a pupil's location may still reside inside or sufficiently around the present view zone, in which case user experience could benefit from maintaining the current location of the view zone and corresponding image(s) at step 640 without re-rendering and/or performing potentially demanding computations. The skilled artisan will appreciate that pupil tracking 610 may also be performed at higher rates than the decision-making and rendering steps of FIG. 6A.

Threshold values, in accordance with various embodiments, may be chosen on a variety of bases, non-limiting examples of which relate to view zone sizes or geometries (e.g. as a function of a view zone dimension, such as the view zone width), typical pupil speeds for a particular display system or user-system configuration (e.g. a typical screen-to-user distance), display system properties, specific applications for which a display is typically used (e.g. a car dashboard light field display, a desktop monitor light field display, a cell phone-based light field display, etc.), or the like. For instance, if a view zone geometry and size, and a display rendering rate are known for a given pupil location, a processor may determine the speed at which a pupil would need to move in order to predict that the pupil will have left the view zone by the time a subsequent rendering could be performed. Such velocity thresholds may also be adaptive or predictive in nature, or may be adjustable, for instance via a setting on the display to be programmed or tuned by a user. A threshold may also be set based on an empirical determination of user experience for a specific device, application, or setting, in accordance with yet another embodiment. For some embodiments, a threshold value is set to be on the order of 0.1 m/s.

Figure 6B:
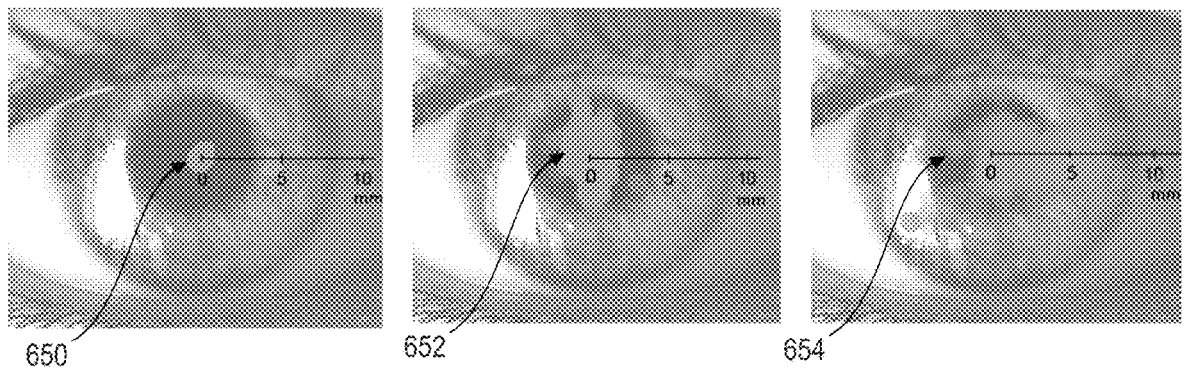
FIG. 6B is exemplary images of an eye of a user showing exemplary associated distributions of data points corresponding to user feature locations sequentially acquired therefrom.
Figure 6C:
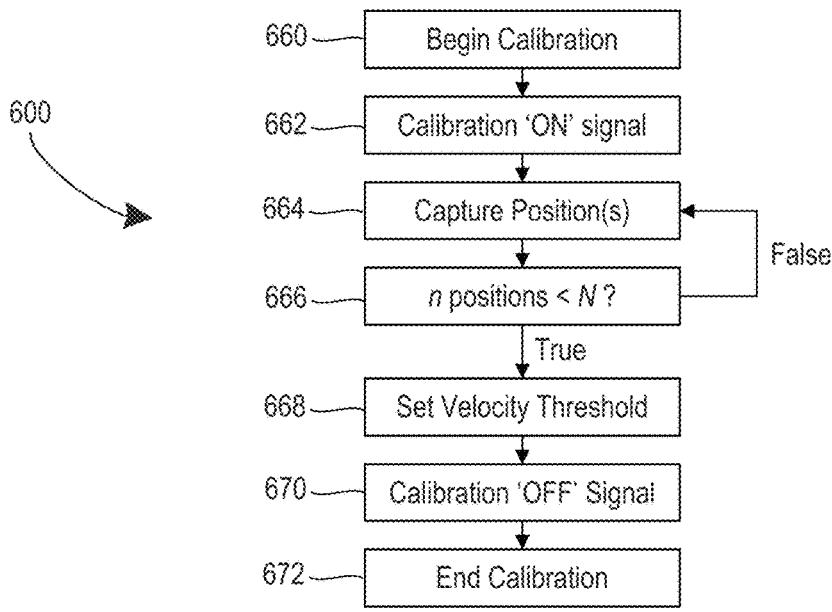
FIG. 6C is a process flow diagram illustrating an exemplary calibration process for determining a velocity threshold.

FIGS. 6B and 6C further illustrate an exemplary process for establishing such a velocity threshold, in accordance with some embodiments. At least in part to this end, FIG. 6B comprises three images of a user eye, such as those that might be acquired by a user feature tracking system. Overlaid thereon are three exemplary distributions of location data points 650, 652, and 654 corresponding to the intersection of lines characterising the palpebral fissure of the eye images (e.g. the intersection 220 of FIG. 2B), as digitally computed from sequentially acquired coordinates of user features associated with facial landmarks associated with the palpebral fissure, as described above. In these examples, the location data points 650, 652, and 654, from left to right, show increasing spreads of feature location distributions inferred from feature coordinates sequentially acquired of the user. While the data points shown were acquired for a user located at different distances from a light field display, as will be further described below, such data serves as an example of different location data distributions that may be utilised to calculate velocity thresholds, in accordance with some embodiments.

Based on such distributions 650, 652, and 654, velocity thresholds may be computed based on a parameter associated with the distribution of feature locations acquired during a calibration process. For example, and in accordance with one embodiment, an instantaneous velocity (i.e. the velocity computed as the distance between each sequentially acquired position data point divided by the time interval between each acquired data point) may be computed for each sequentially acquired location data point in a distribution (e.g. distributions 650, 652, and 654), and a velocity threshold may comprise the average of all instantaneous velocities computed for all data points acquired over the duration of a calibration process. As a higher spread in a distribution of positions corresponds to a greater instantaneous velocities, such a velocity threshold will correspondingly be greater for distributions with greater spreads. Accordingly, for the distributions 650, 652, and 654, a velocity threshold computed as the average of the instantaneous velocities observed over a designated time or number of feature location data points will, from left to right, increase.

In accordance with other embodiments, other metric characterising a distribution of user feature positions (e.g. distribution 650, 652, or 654) may be applied to compute a velocity threshold. For example, different embodiments relate to computing a velocity threshold corresponding to one, two, three, or another value of standard deviations away from a mean of instantaneous velocities observed from a distribution of a user feature positions acquired by a user feature tracking system. That is, in some embodiments, a distribution of user feature location data points may be acquired by a feature tracking system, and the sequential positions may be utilised to establish instantaneous velocities between positions, to determine a distribution of instantaneous velocities. This may in turn be used to establish a velocity threshold based on a parameter associated with the distribution, such as a designated sigma value related to a histogram (e.g. 2 or 3 sigma above a mean value) of the computed instantaneous velocities.

It will be appreciated that a metric in accordance with which a velocity threshold may be established may be designated based on the application at hand. For example, different contexts may generally correspond with higher or lower feature velocities, and/or a higher or lower frequency of user motions that may correspond with a preference to update a viewing zone geometry within which to project light field content. For example, a user lying down and reading may generally exhibit relatively infrequent and minor head motions as compared to a user driving a car at high speeds, or one who is standing at a desk working on a computer. Accordingly, a calibration process and/or velocity threshold may relate to different parameters for different applications. However, for some embodiments, and/or for some applications, a velocity threshold may range between 20 and 200 mm/s. For example, and in accordance with one embodiment, a velocity threshold may be approximately 30 mm/s.

FIG. 6C schematically illustrates an exemplary process 600 by which such a velocity threshold may be digitally computed. This process generally relates to a non-limiting example of a calibration process 600 in which a user is remotely observed via a user feature recognition system associated with the light field display device (e.g. wherein the user is not wearing a head-mounted light field display, although such embodiments are also herein contemplated). As such, and in accordance with some embodiments, the calibration process 600 therefore comprise aspects related to informing the user that a calibration is to be performed. For example, after the calibration process beings 660, the user may be provided with an indication 662 showing the same. This may be beneficial, in accordance with some embodiments as user knowledge of the calibration process may aid in the acquisition of accurate 'baseline' data, wherein the user is, for instance, not moving unnecessarily. In one embodiment, the user may be notified 662 via, for instance, presentation of an 'ON' signal 662, such as the activation of an LED 662 or like signal, to inform the user to, for instance, remain still, or to assume a position representative of use of the light field display, so to obtain feature location values representative of such use for calibration.

The calibration process 600 may then continue with the sequential acquisition 664 of data points representative of a user feature position, such as user pupil positions, those corresponding to a facial landmark, or another feature representative thereof. In accordance with some embodiments, this may comprise the acquisition 664 of a designated number N of feature location data points. For example, and in accordance with some embodiments, a calibration process may, after each acquired location point, evaluate 666 whether the number of acquired points n has reached the designated number N. If not, the calibration process 600 may continue with the acquisition 664 of more position data points for calibration. Upon reaching the prescribed number of calibration data points N, the calibration process 600 set a velocity threshold 668 based on a designated metric, non-limiting examples of which are described above. Upon completion of the acquisition of calibration points, in embodiments comprising the provision of an indicator to the user that the calibration process is underway, the indicator may be turned off 670, such as through the cessation of the activation of an LED, or in a like manner. Having established a velocity threshold 668, the calibration process 600 is then completed 672, in this non-limiting embodiment.

In accordance with one embodiment, such a calibration process may be executed in part via a graphical user interface (GUI) associated with the light field display. For example, calibration may begin upon selection of a 'calibrate' or like button or icon of a GUI, whereby the calibration routine may then begin acquiring user feature positions upon the presentation of an LED indicator to notify the user that calibration is in progress. In accordance with various embodiment, the calibration process may acquire, for instance, between 100 to 200 user feature positions, sequentially, whereby instantaneous velocities may then be calculated to determine a velocity threshold. In accordance with various embodiments, various numbers of data points may be captured. For example, one embodiment relates to the acquisition of 100 user feature positions for calibration. Such a calibration duration may be selected based on, for instance, various system parameters, such as an acquisition rate. For instance, depending on the speed of acquisition, 100 points may provide a balance between the acquisition of sufficient points to accurately establish a threshold, and minimisation of the recording of spurious user movement arising from fatigue or other factors, thereby negatively affects calibration results. For example, the acquisition of greater than 120 points may be determined to be too long for accurate results, thus limiting calibration points to less than 120 user feature positions, in accordance with some embodiments.

For example, one embodiment relates to the acquisition of user feature locations at a frame rate of 30 Hz, wherein images are captured at 1080p resolution. In accordance with another embodiment, feature locations may be acquired at a frame rate of 60 Hz with 720p resolution. The selection of such acquisition parameters may depend on a number of factors, in accordance with different embodiments. For example, if high resolution is not of paramount importance, the latter embodiment may be employed, as such configurations are observed to result in a lower precision, and hence a higher dispersion of feature locations. Conversely, acquisition at lower frame rates but higher resolutions may reduce dispersion, while mitigating negative effects and/or variability arising from lighting conditions. Further, processing resources (e.g. computing power) may similarly be of consideration in designating acquisition parameters, in accordance with some embodiments.

In accordance with one non-limiting embodiment, a digitisation filter may be implemented to reduce variability in acquired user feature locations. For example, various embodiments relate to the recording of feature positions in accordance with a digitisation filter to achieve a precision in coordinates of user features (e.g. facial landmarks) to two significant figures (i.e. ~0.01 mm), as determined by assessments comparing stability and data variation between trials.

Figure 6D:
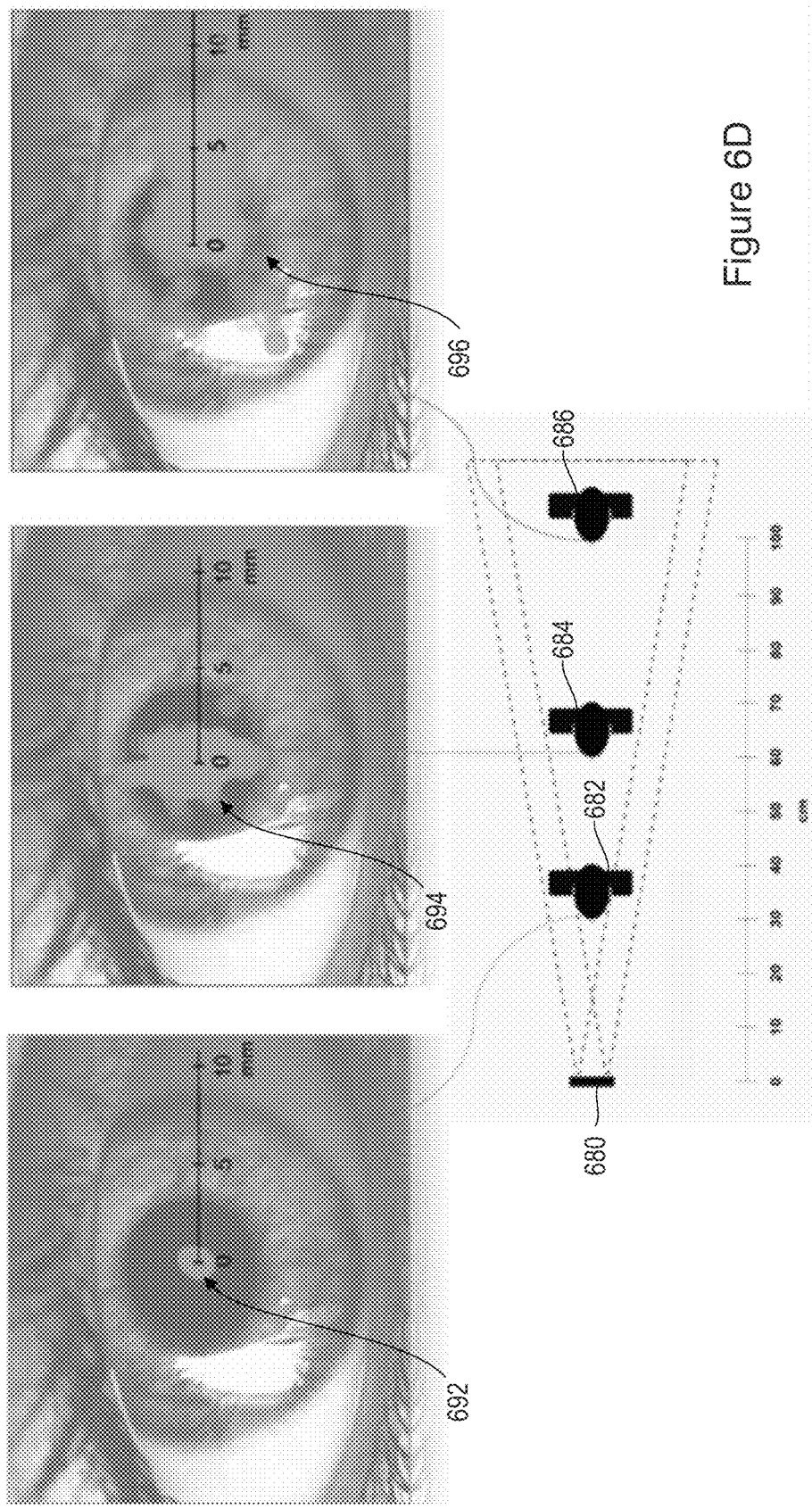
FIG. 6D is a schematic diagram illustrating user feature position distributions acquired for different user distances relative to a light field display, in accordance with various embodiments.

FIG. 6D schematically illustrates various distributions of user feature locations acquired via a stereo camera 380 for various user distances relative thereto. In this example, user feature locations are acquired for three user positions 682, 684, and 686, resulting in respective corresponding location distributions 692, 694, and 696. As observed from the distributions 692, 694, and 696, the spread in user feature locations, in this case corresponding to the intersection of lines characterising the width and height of the palpebral fissure, as described above, increases with distance from the sensor 680. That is, as the farther the user is away from the sensor 680, the greater the variability that is observed in feature locations recorded. Accordingly, in the context of a calibration to determine a threshold velocity, it may be desirable to set a velocity threshold that is larger if a user is farther away, so as to minimise false positives in the determination of whether a user is exhibiting dynamic movement in the presence of relatively large apparent fluctuations in user feature positions, in accordance with some embodiments.

In accordance with different embodiments, it may be preferable to consider either two-dimensional or three-dimensional data with respect to user feature positions during calibration and/or use. That is, while various embodiments relate to the provision of light field content in a designated viewing zone disposed in three-dimensional space (e.g. around user pupil location as determined from positional data of distinct user features), for the purposes of assessing whether a user is in a static or dynamic state, it may be preferred to consider two-dimensional image data with respect to, for instance, user feature positions. This may, for instance, reduce an observed variability in user locations, without sacrificing performance, in accordance with some embodiments. For example, and without limitation, some embodiments may relate to the provision of light field content when a user is positioned at a typical distance away from the device, such as when they are driving a car, reading a smartphone or tablet, or the like. Accordingly, in order to reduce the demand on computational resources, or to provide a more stable viewing experience, a user feature tracker may be configured to process only 2D images of the user to ascertain whether the user has moved from a previous location, or if they are in a dynamic state.

Such 2D tracking may be of further benefit depending on, for instance, the capabilities of a feature tracker. For example, one embodiment relates to the user of a software development kit (SDK) to extract feature positions, wherein x and y coordinates of user features are extracted directly from images captured by a camera, as illustrated in FIG. 6D, while the depth or z coordinates are estimated based on a distinct analysis process of the SDK. In some cases, these depth coordinates associated with features (e.g. facial landmarks) may inherently comprise a higher degree of dispersion than coordinates extracted directly from images, and may thus lead to apparently less stable feature positions if explicitly considered for the purposes of ascertaining dynamic and static user states. In such cases, and in accordance with some embodiments, it may therefore be preferred to limit the assessment of user movement to consider only 2D coordinates, although it will be appreciated that other embodiments may indeed consider feature positions in accordance with 3D coordinates.

Furthermore, in embodiments related to such remote tracking of user features, a change in the depth coordinate may in fact be captured to an extent by changes in measured x and y positions as a result of 3D movement. While this may not necessarily affect computational processes and execution, consideration of feature positions in 2D (e.g. as data points are illustrated in FIG. 6D) may result in a more stable output of light field content, thus improving user experience. However, as noted above, various embodiments may, depending on, for instance, the application at hand, or the particular sensor configuration and/or feature position extraction process employed, incorporate depth-related coordinates in various feature tracking processes.

Figure 8:
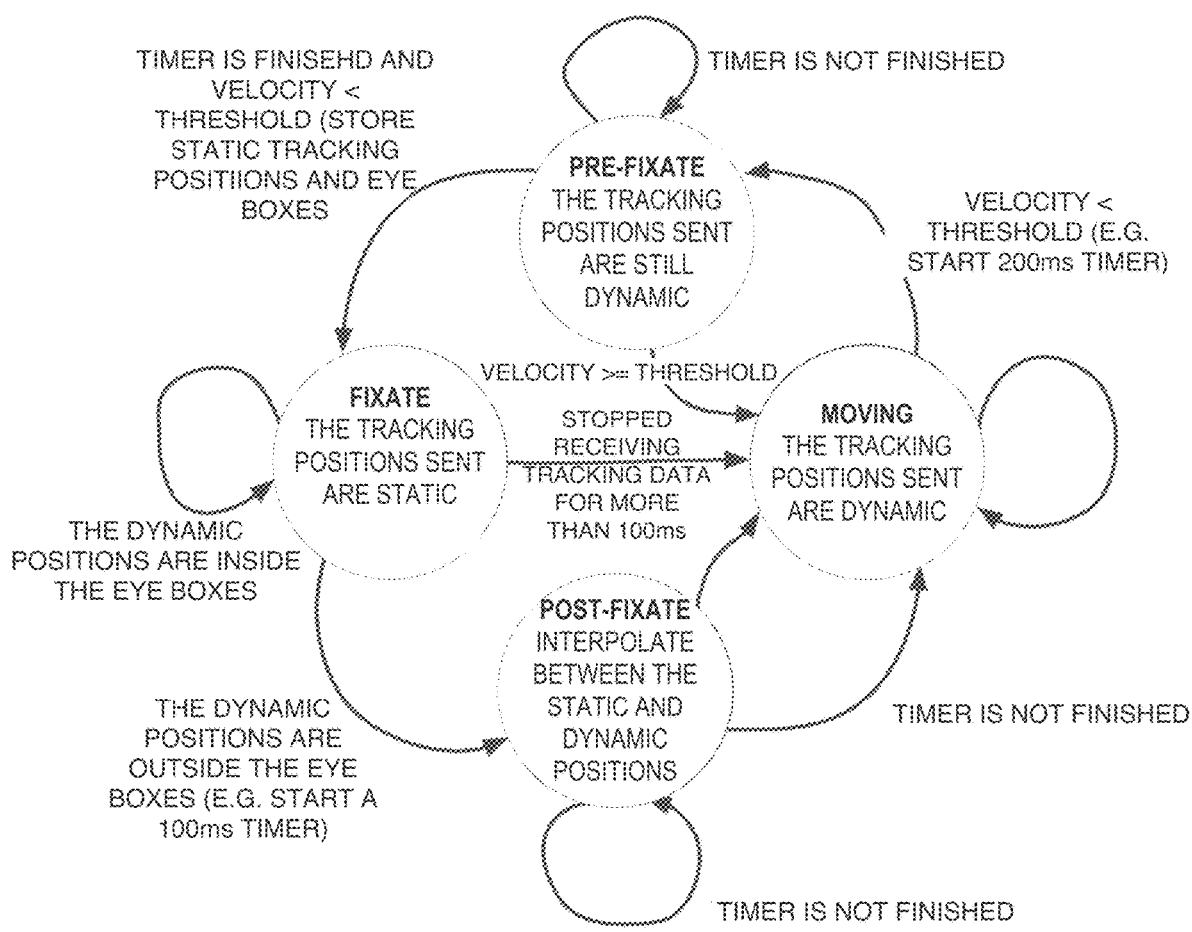
FIG. 8 is a schematic state diagram of a predictive pupil tracking system, in accordance with one embodiment.

FIG. 7 shows a schematic diagram of an exemplary process for an improved user experience via predictive pupil determination, in accordance with another embodiment. Reference is also made to FIG. 8 in which different exemplary viewer pupil dynamic states, and transitions therebetween, are also illustrated. In this example, a pupil tracker obtains position and/or velocity data related to a pupil or pupils. If the determined pupil or feature velocity is not below a certain threshold (i.e. the pupil is determined to be in a 'moving' or 'dynamic' mode), as determined at step 720, images will be rendered to be projected within a view zone in a new location in step 730, wherein the new location may correspond to either the latest pupil location as determined by the pupil tracker, or at a location predicted from related pupil location data to provide a positive viewer experience. If the pupil velocity is below the designated threshold (i.e. the pupil is in a 'fixate', 'fixed', or 'static' mode), it may be determined that the current view zone location may be acceptable for a pupil at a subsequent time, in which case the current view zone location may be maintained at step 760.

In accordance with some embodiments, various criteria may be additionally applied to maintain the view zone location. For example, it may be required that the measured or calculated pupil velocity be below the velocity threshold for a certain amount of time (e.g. 200 ms) as measured using a digital timer 740 (i.e. the pupil is 'pre-fixate'). An exemplary process may then repeat the comparison of the velocity to the threshold at step 750, either repeatedly throughout a designated threshold wait period, or again at a specific later time. Other criteria or methods to filter or otherwise provide a reliable decision on movement may be employed without departing from the general scope of this disclosure. If the condition of being below the threshold is not met at step 750, the view zone location and corresponding image(s) may then be rendered for projection at a new location in step 730. Otherwise, the current view zone location may be maintained at 760.

A view zone location may be maintained for an amount of time that is deemed appropriate, or until one or more conditions for determining movement 770 are met. In accordance with various embodiments, non-limiting examples of a condition for movement may be that a tracked pupil location (or a pupil location inferred from user feature tracking) has been determined to have crossed a boundary of the current view zone, that a second threshold velocity, which may or may not be the same threshold velocity used to initiate maintaining of a view zone location, has been observed of inferred for the pupil, that feature tracking data is no longer available or has not been received for a designated amount of time (e.g. a processor or application has stopped receiving tracking data for more than, for instance, 100 ms), or that a timer has expired (e.g. a view zone has been static for, for instance, 100 ms).

Optionally, and in accordance with various embodiments, another step or steps may be employed to improve a viewer experience before returning to rendering at a current or predicted pupil location at step 730. A non-limiting example may be that, given that the pupil was recently below a designated threshold velocity, the pupil may be predicted to benefit from a view zone that is in a similar location to the previous view zone, even though a condition for movement has been met (i.e. the pupil considered to be in a 'post-fixate' mode). For instance, if the pupils are determined to have crossed a boundary of the view zone in step 770, their velocity may still be low, and a new view zone location that would provide a positive viewing experience would lie somewhere between the new pupil location and the previous location. This new view zone location may therefore be an interpolation, as in step 780, of the previous view zone location and the pupil location. Non-limiting examples of an interpolation as herein described may be an average, a weighted average, or some other function for which a positive viewing experience can be predicted. The interpolation may be performed for a designated amount of time 790 after a condition for movement is met, or may, alternatively or in addition, be a function of time since the condition was met. For instance, if a condition for movement has been met due to a pupil location crossing a boundary of a static view zone, the next rendered view zone location may be a weighted average between the previous view zone location and the current pupil location, wherein every 10 ms, the weight of the pupil location in the weighted average increases in increments of 10%, until, after 100 ms, the location of the view zone will be that of the tracked pupil, as in step 730.

The skilled artisan will appreciate that interpolation steps may be optionally implemented based on the means by which a condition for movement was met. For instance, if a pupil location has been determined to have crossed a boundary of a static view zone, and/or is deemed to be moving below a certain speed, an interpolation of pupil position and previous view zone location may be performed over 100 ms to calculate the next view zone location. However, if a system implementing a process herein described stopped receiving tracking data for 100 ms, view zone location may be updated based solely on new pupil location data, as in step 730, in accordance with at least one embodiment.

While such a rendering or light field updating scheme may be beneficial for some applications, other applications may benefit from an alternative light field viewing zone geometry updating protocol. For example, while some applications may benefit from updating light field viewing zone geometries upon observation of the pupil or another use feature exceeding a threshold velocity, for other applications, updating a view zone geometry, and thus rendered content, may provide an improved user experience when a light field viewing zone geometry is maintained while user is relatively static, and, upon observation of movement exceeding a velocity threshold, maintaining the previous light field viewing zone geometry until it is observed that the user has returned to a relatively static state.

To further elucidate this notion, one may consider an idealised scenario in which an eye tracking system, regardless of lighting conditions or environment, may report a pupil position with perfect accuracy and precision, and a light field system operating in accordance with unlimited processing speeds to instantaneously render and project (i.e. without any lag) light field content to the observed pupil position. Under such conditions, it may be sufficient to operate a light field display in accordance with a mode in which content is continuously updated in response to real-time pupil centre positions. However, given eye tracking outputs under real conditions, and practically achievable processing speeds, such attempts often provide for a negative user experience. Various embodiments herein described, however, mitigate such effects through the operation of a light field display in accordance with application-specific operational modes.

For instance, the use of an RGB-based camera may provide improved tracking of the position of user pupils or features in brightly lit environments. One such scenario, in accordance with one embodiment, may relate to the provision of visual acuity-corrected light field content from a dashboard display in a car on a sunny day. Such a scenario may require, for instance, relatively low exposure settings on a user tracking device, and may benefit from lower gain settings, higher acquisition speeds, and thus rendering speeds. Such an operational mode may thus enable more rapid or continuous updating of light field content with a positive experience than, for instance, a similar application at night in low light conditions, and/or when the provision of content may benefit from user tracking using IR light provided by IR emitters. Such different operational configurations may, in accordance with some embodiments, be beneficially operated in accordance with different operational modes.

Similarly, a driver of a car traveling at high speeds on a highway may have a tendency to exhibit rapid, frequent, and large head motions (e.g. to check side mirrors, the rear-view mirror, the dashboard, the front view, and the like) as compared to a driver of a car traveling at low speeds on a country road, or at a stop light in a city. In the case of the former, constant updating of rendered light field content via a dashboard light field display based on moving pupil positions may be unnecessary and/or redundant, given that the driver is rarely looking at the dashboard and is rather almost continuously moving their head. Accordingly, computational load may be relieved if light field content is only updated when a tracker of a user feature (e.g. an eye tracker) observes a fixed user state within the tracker's field of view, in accordance with some embodiments. It will be appreciated that, in some embodiments, such aspects may further benefit from system configurations in which a tracking sensor is placed such that it naturally observes the face of the user when the user is looking at the dashboard or other relevant area for the consumption of light field content. Similarly, such embodiments may benefit from predictive processes in which an updated view zone geometry may be calculated in advance of a fixed user state, such that rendering may be performed preemptively (e.g. while the user is moving) to minimise user perception of the re-rendering of content to accommodate large changes in pupil positions.

In accordance with yet other embodiments, an operational mode for updating the rendering of light field content may be designated based in part on a user activity. For example, an in accordance with one embodiment, a light field display may provide text content for reading, wherein a user may be lying down such that their head does not exhibit frequent or large motion relative to the display. In such a context, it may be preferred that light field content is updated relatively infrequently (e.g. due to the relative lack of head movement) as compared to, for instance, when a user is sitting and working using a light field display screen. In the latter case, it may be preferred to operate the light field display in accordance with a mode in which content is refreshed frequently and/or during movement, as described above, while in the former case, it may be preferred to withhold content and/or light field geometry updating upon movement until a time at which the user exhibits a relatively fixed state.

Figure 9:
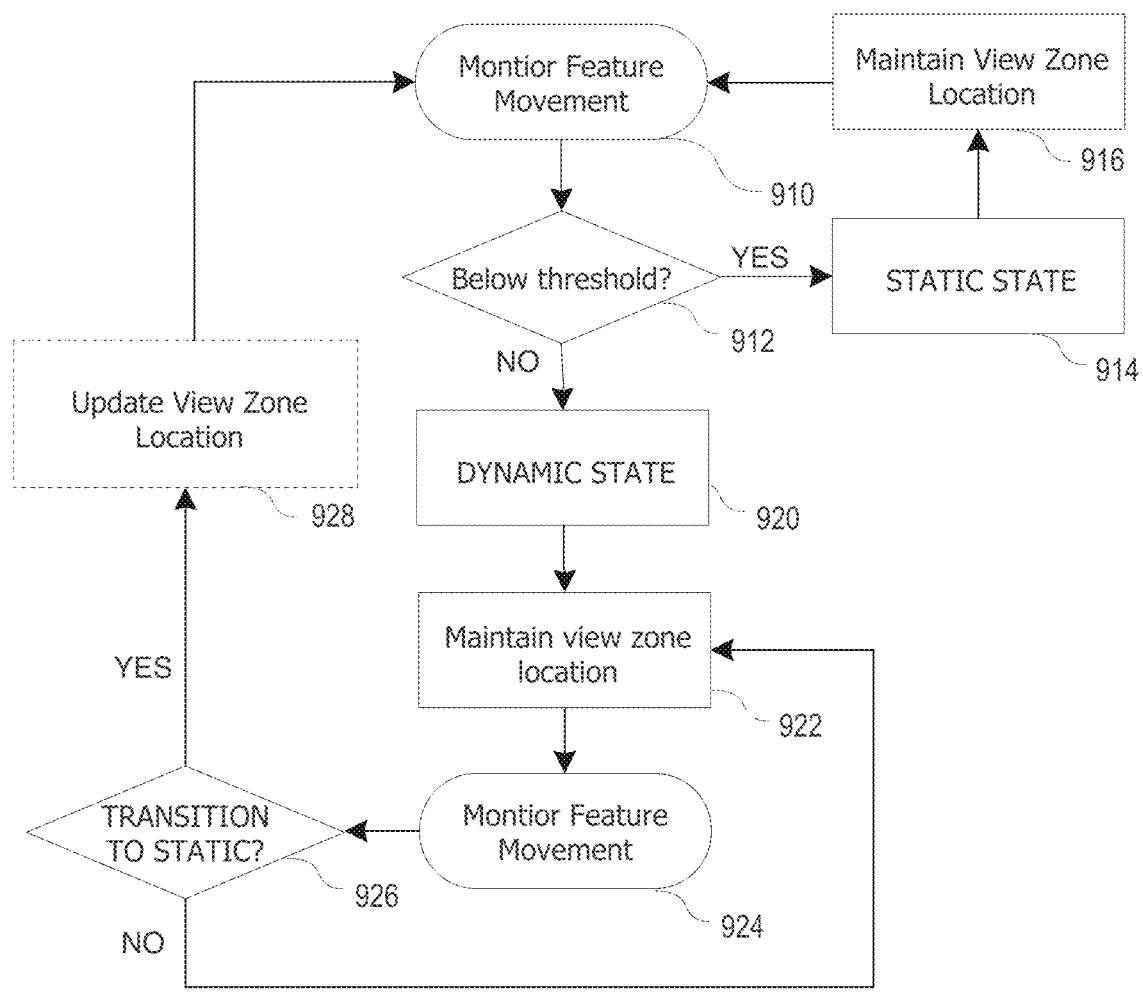
FIG. 9 is a process flow diagram illustrating another operational mode of a user feature tracking process for updating a light field view zone geometry, in accordance with various embodiments.

FIG. 9 is a schematic diagram illustrating one such embodiment, wherein an exemplary light field updating process, generally referred to with the numeral 900, provides for an improved user experience by maintaining a viewing zone geometry until a user is observed to return to a fixed state. It will be appreciated that the updating process 900 is provided for illustrative purposes, only, and that various other embodiments may relate to or comprise other aspects. For example, it will be appreciated that various aspects described above with respect to FIGS. 7 and 8 may be incorporated within a light field updating process such as that described with reference to FIG. 9. For instance, one embodiment relates to the evaluation of various conditions for movement, including, for example, whether a pupil has been deemed to have crossed a boundary of a maintained view zone while in a user has been observed to be in a relatively static state, if tracking data has not been received for a designated duration, or if a timeout duration has elapsed, to initiate an updating of a view zone geometry, regardless of whether the conditions described below with respect to FIG. 9 have been observed.

In the exemplary embodiment of FIG. 9, a user feature tracker obtains position and/or velocity data 910 related to a user feature or features, such as a pupil position, one or more facial landmarks, or the like. If the determined pupil or feature velocity is assessed 912 to be below a certain threshold, such as a velocity threshold described above with respect to FIGS. 6A to 6D, the user is determined to be in a relatively 'static' state 914, and light field content will continue to be rendered to be projected within a maintained view zone, as illustrated by step 916. That is, light field content will continue to be rendered in accordance with a viewing zone geometry and/or location that was previously defined in accordance with a previous acquired user feature location.

If the feature movement 910 is, on the other hand, determined to not be below a threshold velocity 912, it is determined that the user is in a 'dynamic' state (i.e. is moving above a threshold velocity). In comparison the description provided above with respect to FIGS. 7 and 8, however, in the process 900, upon determination of a dynamic user state 920, a light field system will continue to maintain a viewing zone geometry and/or location 922. That is, while a user is observed to be moving above designated threshold velocity, light field content will continue to be rendered in accordance with a view zone location or geometry 922 that was previously defined in respect of a previously acquired user feature location.

Once is it determined that the user is in a dynamic state 920 and a light field view zone is maintained 922, the process 900 continues monitoring feature movement 924. As movement in monitored 924, the process 900 evaluates whether or not a transition to a static state 926 is observed. If not, then the view zone geometry or location is maintained 922. However, if a transition indicative of a current or future static state 926 is observed or is suggested, the process may then initiate an update 928 of a view zone geometry or location. That is, a light field system may re-render light content so to be projected within an updated view zone defined in accordance with a current or predicted feature location.

In accordance with various embodiments, a transition to a static state 926 may be observed or predicted in various manners. For example, and without limitation, a transition 926 may be directly observed if movement of the user feature being monitored 924 crosses a velocity threshold from a relatively dynamic to a relatively static state. Such a velocity threshold for transition from a relatively dynamic to a relatively static state may, in accordance with some embodiments, correspond to the velocity threshold 912 previously defined for recognising whether a user feature is indicative of a static state 914, or, in other embodiments, it may correspond to a distinct transitional velocity threshold corresponding to a different parameter or metric. For example, and without limitation, a transitional velocity threshold for indicating a transition to a static state from a dynamic state 926 may be a function of the previous velocity threshold 912 (e.g. 60%, 90%, 150%, 300%, or the like, of the previous threshold 912), or may be defined in accordance with a different metric associated with a distribution of feature positions acquired during a calibration process.

In accordance with other embodiments, a transition from a dynamic state to a static state 926 may be recognised by evaluating other aspects of feature movement 924 while in a dynamic state 920. For example, and without limitation, sequentially acquired user feature positions may be digitally processed to compute a feature velocity and acceleration (or deceleration), wherein a designated dynamics of deceleration and velocity may correspond with or be consistent with an imminent cessation of user movement, or an imminent relatively static user state. Further, in accordance with some such embodiments, such computations may further enable an extrapolation of user feature positions for future times. It is thus possible, in accordance with some such embodiments, to predict a desirable future viewing zone location in which to project light field content upon the user becoming static, therefore allowing the light field system and associated processing resources additional time in which ray tracing and other computations may be performed to prepare for or improve the presentation of light field content within the updated viewing zone location 928. As such, the updated viewing zone location may be a function of one or more of the sequentially acquired user feature locations, in accordance with some embodiments. Alternatively, or additionally, in accordance with some embodiments, an updated view zone location may be defined in accordance with a newly acquired feature location directly, such as if the user feature is a pupil, or corresponds substantially to the location of the pupil, such as if the user feature comprises the intersection of lines defining the width and height of the palpebral fissure, as described above. In accordance with other embodiments, an updated view zone location may be defined relative to a newly acquired feature location, such as if the user feature is another reference point having a known disposition relative to a user pupil location.

In accordance with various embodiments, such an operational mode 900 may be beneficial for providing an improved user experience for various light field applications. For example, in comparison to the operational mode described by FIGS. 7 and 8 in which view zone locations are continuously updated during observed dynamic user movement, the operational mode 900 may improve stability of perception of projected light field content. For example, user feature positions may be subject to noise arising from the acquisition process, similar to how noise is observed in the distribution of calibration locations in FIG. 6D. Accordingly, when updating light field view zone locations during movement, rendering geometries may be inaccurate, which may reduce user experience and quality of viewing during dynamic motion. Moreover, by maintaining a light field viewing zone geometry during dynamic motion, a user is not subjected to continuously updated content, which may again improve stability and reduce jitteriness arising from continuous attempts to render light field content in accordance with 3D ray tracing processes.

In accordance with some embodiments, various criteria may be additionally applied to maintain or update the view zone location within the context of the operational mode 900 of FIG. 9. For example, it may be required that the measured or calculated feature velocity be below the velocity threshold for a certain amount of time (e.g. 200 ms) as measured using a digital timer. An exemplary process may then repeat the comparison of the velocity to the threshold, either repeatedly throughout a designated threshold wait period, or again at a specific later time. Other criteria or methods to filter or otherwise provide a reliable decision on movement may be employed without departing from the general scope of this disclosure.

A view zone location may be maintained for an amount of time that is deemed appropriate, or until one or more conditions for determining movement are met. In accordance with various embodiments, non-limiting examples of a condition for movement may be that a tracked feature location corresponds with a pupil having crossed a boundary of the current view zone, that a second threshold velocity, which may or may not be the same threshold velocity used to initiate maintaining of a view zone location, has been observed of inferred for the pupil, that feature tracking data is no longer available or has not been received for a designated amount of time (e.g. a processor or application has stopped receiving tracking data for more than, for instance, 100 ms), or that a timer has expired (e.g. a view zone has been static for, for instance, 100 ms).

Optionally, and in accordance with various embodiments, another step or steps may be employed within the context of the process 900 of FIG. 9 to improve a viewer experience before returning to rendering at a current or predicted pupil location. A non-limiting example may be that, given that the pupil was recently below a designated threshold velocity, the pupil may be predicted to benefit from a view zone that is in a similar location to the previous view zone, even though a condition for movement has been met (i.e. the pupil considered to be in a 'post-fixate' mode). For instance, if the pupils are determined to have crossed a boundary of the view zone, their velocity may still be low, and a new view zone location that would provide a positive viewing experience would lie somewhere between the new pupil location and the previous location. This new view zone location may therefore be an interpolation of the previous view zone location and the pupil location, as described above with respect to FIGS. 7 and 8.

Exemplary Light Field System

It will be appreciated that the systems and methods described above may apply within various contexts of an adjusted pixel rendering method used to produce an adjusted user image perception, for example, when applied to a light field display device. In some embodiments, the adjusted user image perception can accommodate, to some degree, a user's reduced visual acuity. To improve performance and accuracy, the user's pupil location, and changes therein, can be used as input, either via an integrated pupil tracking device and/or engine, or via interface with an external device and/or engine.

For instance, the devices, displays and methods described herein may allow a user's perception of an input image or other visual content to be displayed, to be adjusted or altered using the light field display as a function of the user's pupil location, or as a function of another user feature such that light field content may be perceived by a user. For instance, in some examples, users who would otherwise require corrective eyewear such as glasses or contact lenses, or again bifocals, may consume images or visual content produced by such devices, displays and methods in clear or improved focus without the use of such eyewear. Other light field display applications, such as 3D displays and the like, may also benefit from the solutions described herein, and thus, should be considered to fall within the general scope and nature of the present disclosure.

For example, some of the herein described embodiments provide for digital display devices, or devices encompassing such displays, for use by users having reduced visual acuity, whereby images ultimately rendered by such devices can be dynamically processed to accommodate the user's reduced visual acuity so that they may consume rendered images without the use of corrective eyewear, as would otherwise be required. As noted above, embodiments are not to be limited as such as the notions and solutions described herein may also be applied to other technologies in which a user's perception of an input image to be displayed can be altered or adjusted via the light field display.

Generally, digital displays as considered herein will comprise a set of image rendering pixels and an array of light field shaping elements, also herein referred to interchangeably as a light field shaping layer, disposed at a preset distance therefrom so to controllably shape or influence a light field emanating therefrom. For instance, each light field shaping layer will be defined by an array of optical elements centred over a corresponding subset of the display's pixel array to optically influence a light field emanating therefrom and thereby govern a projection thereof from the display medium toward the user, for instance, providing some control over how each pixel or pixel group will be viewed by the viewer's eye(s). In accordance with various embodiments, arrayed optical elements may include, but are not limited to, lenslets, microlenses or other such diffractive optical elements that together form, for example, a lenslet array; pinholes or like apertures or windows that together form, for example, a parallax or like barrier; concentrically patterned barriers, e.g. cut outs and/or windows, such as a to define a Fresnel zone plate or optical sieve, for example, and that together form a diffractive optical barrier (as described, for example, in Applicant's co-pending U.S. application Ser. No. 15/910,908, the entire contents of which are hereby incorporated herein by reference); and/or a combination thereof, such as for example, a lenslet array whose respective lenses or lenslets are partially shadowed or barriered around a periphery thereof so to combine the refractive properties of the lenslet with some of the advantages provided by a pinhole barrier.

In operation, the display device will also generally invoke a hardware processor operable on image pixel (or subpixel) data for an image to be displayed to output corrected or adjusted image pixel data to be rendered as a function of a stored characteristic of the light field shaping layer (e.g. layer distance from display screen, distance between optical elements (pitch), absolute relative location of each pixel or subpixel to a corresponding optical element, properties of the optical elements (size, diffractive and/or refractive properties, etc.), or other such properties, and a selected vision correction or adjustment parameter related to the user's reduced visual acuity or intended viewing experience. While light field display characteristics will generally remain static for a given implementation (i.e. a given shaping layer will be used and set for each device irrespective of the user), image processing can, in some embodiments, be dynamically adjusted as a function of the user's visual acuity or intended application so to actively adjust a distance of a virtual image plane, or perceived image on the user's retinal plane given a quantified user eye focus or like optical aberration(s), induced upon rendering the corrected/adjusted image pixel data via the static optical layer, for example, or otherwise actively adjust image processing parameters as may be considered, for example, when implementing a viewer-adaptive pre-filtering algorithm or like approach (e.g. compressive light field optimisation), so to at least in part govern an image perceived by the user's eye(s) given pixel or subpixel-specific light visible thereby through the layer.

Accordingly, a given device may be adapted to compensate for different visual acuity levels and thus accommodate different users and/or uses. For instance, a particular device may be configured to implement and/or render an interactive graphical user interface (GUI) that incorporates a dynamic vision correction scaling function that dynamically adjusts one or more designated vision correction parameter(s) in real-time in response to a designated user interaction therewith via the GUI. For example, a dynamic vision correction scaling function may comprise a graphically rendered scaling function controlled by a (continuous or discrete) user slide motion or like operation, whereby the GUI can be configured to capture and translate a user's given slide motion operation to a corresponding adjustment to the designated vision correction parameter(s) scalable with a degree of the user's given slide motion operation. These and other examples are described in Applicant's co-pending U.S. patent application Ser. No. 15/246,255, the entire contents of which are hereby incorporated herein by reference.

In general, a digital display device as considered herein may include, but is not limited to, smartphones, tablets, e-readers, watches, televisions, GPS devices, laptops, desktop computer monitors, televisions, smart televisions, handheld video game consoles and controllers, vehicular dashboard and/or entertainment displays, ticketing or shopping kiosks, point-of-sale (POS) systems, workstations, or the like.

Generally, the device will comprise a processing unit, a digital display, and internal memory. The display can be an LCD screen, a monitor, a plasma display panel, an LED or OLED screen, or any other type of digital display defined by a set of pixels for rendering a pixelated image or other like media or information. Internal memory can be any form of electronic storage, including a disk drive, optical drive, read-only memory, random-access memory, or flash memory, to name a few examples. For illustrative purposes, memory has stored in it a vision correction or image adjustment application and/or a predictive pupil or feature tracking engine, though various methods and techniques may be implemented to provide computer-readable code and instructions for execution by the processing unit in order to process pixel data for an image to be rendered in producing corrected pixel data amenable to producing a corrected image accommodating the user's reduced visual acuity (e.g. stored and executable image correction application, tool, utility or engine, etc.). Other components of the electronic device may optionally include, but are not limited to, one or more rear and/or front-facing camera(s) (e.g. for onboard pupil tracking capabilities), pupil tracking light source, an accelerometer and/or other device positioning/orientation devices capable of determining the tilt and/or orientation of electronic device, or the like.

For example, the electronic device, or related environment (e.g. within the context of a desktop workstation, vehicular console/dashboard, gaming or e-learning station, multimedia display room, etc.) may include further hardware, firmware and/or software components and/or modules to deliver complementary and/or cooperative features, functions and/or services. For example, as previously noted, a pupil/eye tracking system may be integrally or cooperatively implemented to improve or enhance corrective image rendering by tracking a location of the user's eye(s)/pupil(s) (e.g. both or one, e.g. dominant, eye(s)) and adjusting light field corrections accordingly. For instance, the device may include, integrated therein or interfacing therewith, one or more eye/pupil tracking light sources, such as one or more infrared (IR) or near-IR (NIR) light source(s) to accommodate operation in limited ambient light conditions, leverage retinal retro-reflections, invoke corneal reflection, and/or other such considerations. For instance, different IR/NIR pupil tracking techniques may employ one or more (e.g. arrayed) directed or broad illumination light sources to stimulate retinal retro-reflection and/or corneal reflection in identifying and tracking a pupil location. Other techniques may employ ambient or IR/NIR light-based machine vision and facial recognition techniques to otherwise locate and track the user's eye(s)/pupil(s). To do so, one or more corresponding (e.g. visible, IR/NIR) cameras may be deployed to capture eye/pupil tracking signals that can be processed, using various image/sensor data processing techniques, to map a 3D location of the user's eye(s)/pupil(s). In the context of a mobile device, such as a mobile phone, such eye/pupil tracking hardware/software may be integral to the device, for instance, operating in concert with integrated components such as one or more front facing camera(s), onboard IR/NIR light source(s) and the like. In other user environments, such as in a vehicular environment, eye/pupil tracking hardware may be further distributed within the environment, such as dash, console, ceiling, windshield, mirror or similarly-mounted camera(s), light sources, etc.

Furthermore, an electronic device, in some embodiments, may comprise a light field shaping layer (LFSL) or array of light field shaping elements overlaid atop a display thereof and spaced therefrom (e.g. via an integrated or distinct spacer) or other such means as may be readily apparent to the skilled artisan. For the sake of illustration, some embodiments are described herein within the context of a light field shaping layer defined, at least in part, by a lenslet array comprising an array of microlenses (also interchangeably referred to herein as lenslets) that are each disposed at a distance from a corresponding subset of image rendering pixels in an underlying digital display. It will be appreciated that while a light field shaping layer may be manufactured and disposed as a digital screen overlay, other integrated concepts may also be considered, for example, where light field shaping elements are integrally formed or manufactured within a digital screen's integral components such as a textured or masked glass plate, beam-shaping light sources or like component. Accordingly, each lenslet will predictively shape light emanating from these pixel subsets to at least partially govern light rays being projected toward the user by the display device. As noted above, other light field shaping layers may also be considered herein without departing from the general scope and nature of the present disclosure, whereby light field shaping will be understood by the person of ordinary skill in the art to reference measures by which light, that would otherwise emanate indiscriminately (i.e. isotropically) from each pixel group, is deliberately controlled to define predictable light rays that can be traced between the user and the device's pixels through the shaping layer.

For greater clarity, a light field is generally defined as a vector function that describes the amount of light flowing in every direction through every point in space. In other words, anything that produces or reflects light has an associated light field. The embodiments described herein produce light fields from an object that are not 'natural' vector functions one would expect to observe from that object. This gives it the ability to emulate the 'natural' light fields of objects that do not physically exist, such as a virtual display located far behind the light field display, which will be referred to herein as a 'virtual image'.

In some embodiments, light field rendering may be adjusted to effectively generate a virtual image on a virtual image plane that is set at a designated distance from an input or inferred user pupil location, for example, so to effective push back, or move forward, a perceived image relative to the display device in accommodating a user's reduced visual acuity (e.g. minimum or maximum viewing distance). In yet other embodiments, light field rendering may rather or alternatively seek to map the input image on a retinal plane of the user, taking into account visual aberrations, so to adaptively adjust rendering of the input image on the display device to produce the mapped effect. Namely, where the unadjusted input image would otherwise typically come into focus in front of or behind the retinal plane (and/or be subject to other optical aberrations), this approach allows to map the intended image on the retinal plane and work therefrom to address designated optical aberrations accordingly. Using this approach, the device may further computationally interpret and compute virtual image distances tending toward infinity, for example, for extreme cases of presbyopia. This approach may also more readily allow, in accordance with some embodiments, for adaptability to other visual aberrations that may not be as readily modeled using a virtual image and image plane implementation. In both of these examples, and like embodiments, the input image is digitally mapped to an adjusted image plane (e.g. virtual image plane or retinal plane) designated to provide the user with a designated image perception adjustment that at least partially addresses designated visual aberrations. Naturally, while visual aberrations may be addressed using these approaches, other visual effects may also be implemented using similar techniques.

In will be appreciated that, in accordance with various embodiments, light field content may be rendered in accordance with various ray tracing processes known in the art. Such ray tracing processes may, in some embodiments, relate to the vector-based ray tracing computations in consideration of 3D system geometries and configurations (e.g. the position of a user pupil in three dimensions relative to one or more components of a light field display). Such ray tracing processes and/or systems may be employed to determine, for instance, rendering patterns on a pixelated display screen to produce an adjusted image perception via a light field shaping layer (LFSL) or array of light field shaping elements, for example a computationally corrected image that accommodates for the user's reduced visual acuity. Exemplary ray tracing processes and systems in the context of providing perception-adjusted content with a light field display may be found in, for instance, Applicant's co-pending U.S. patent application Ser. No. 17/239,385 entitled 'Pupil Tracking System and Method, and Digital Display Device and Digital Image Rendering System and Method using Same', the entire contents of which are hereby incorporated by reference.

It will be appreciated that, in some embodiments, a light field system or process may relate to the receipt as input a variable corresponding to the 2D or 3D location of a pupil, or of a user feature representative thereof, and optionally a parameter corresponding to a pupil size. As detailed above, the input feature location may include a current feature location as output from a corresponding feature tracking system, or a predicted pupil location, for example, when a process is implemented at a higher refresh rate than that otherwise available from the feature tracking system, for instance, or if a pupil or feature is moving sufficiently slowly that view zone re-rendering may not be necessary.

As will be appreciated by the skilled artisan, the input feature location may be provided by an external pupil or feature tracking engine and/or device, or again provided by an internal engine and/or integrated devices, depending the application and implementation at hand. For example, a self-contained digital display device such as a mobile phone, tablet, laptop computer, digital television, or the like may include integrated hardware to provide real time feature tracking capabilities, such as an integrated camera and machine vision-based pupil or feature tracking engine; integrated light source, camera and glint-based pupil tracking engine; and/or a combination thereof. In other embodiments or implementations, external feature tracking hardware and/or firmware may be leveraged to provide a real time feature location. For example, a vehicular dashboard, control or entertainment display may interface with an external camera(s) and/or feature tracking hardware to produce a similar effect. Naturally, the integrated or distributed nature of the various hardware, firmware and/or software components required to execute the predictive feature tracking functionalities described herein may vary for different applications, implementations and solution at hand.

The feature location, in one embodiment, is the three-dimensional coordinates of at least one the user's pupils' centre with respect to a given reference frame, for example a point on the device or display. This pupil location may be derived from any eye/pupil tracking method known in the art. In some embodiments, the pupil location may be determined prior to any new iteration of a rendering process, or in other cases, at a lower framerate. In some embodiments, only the pupil location of a single user's eye may be determined, for example the user's dominant eye (i.e. the one that is primarily relied upon by the user). In some embodiments, this position, and particularly the pupil distance to the screen, may otherwise or additionally be rather approximated or adjusted based on other contextual or environmental parameters, such as an average or preset user distance to the screen (e.g. typical reading distance for a given user or group of users; stored, set or adjustable driver distance in a vehicular environment; etc.).

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean 'one and only one' unless explicitly so stated, but rather 'one or more.' All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A computer-implemented method, automatically implemented by one or more digital processors, for improving a perceptive experience of light field content projected via a light field display within a light field viewing zone, the method comprising:
   sequentially acquiring a user feature location;
   digitally computing from at least some said sequentially acquired user feature location a velocity of said user feature location over time;
   digitally comparing said velocity with a designated threshold velocity, wherein velocities below and above said designated threshold are respectively associated with a relatively static and a relatively dynamic state;
   digitally rendering the light field content via the light field display in accordance with a maintained light field viewing zone geometry digitally defined in respect of a previously acquired user feature location to project the light field content within a maintained light field viewing zone in accordance with said previously acquired user feature location; and
   upon said velocity corresponding with a transition from said relatively dynamic state to said relatively static state, digitally adjusting a rendering geometry of the light field content via the light field display so to correspondingly adjust said maintained light field viewing zone geometry to project the light field content within an adjusted light field viewing zone in accordance with a newly acquired user feature location.

2. The computer-implemented method of claim 1, further comprising digitally adjusting said rendering geometry of the light field image via the light field display so to correspondingly adjust said maintained light field viewing zone geometry to correspond to a function of said newly acquired user feature location upon a designated condition for movement of said maintained light field viewing zone geometry being met.

3. The computer-implemented method of claim 2, wherein said designated condition for movement of said maintained light field viewing zone geometry comprises at least one of said user feature location crossing a defined boundary of said maintained light field viewing zone geometry, said maintained light field viewing zone geometry remaining static for a prescribed period of time, said velocity decreasing below a transitional velocity threshold, or at least some of said sequentially acquired user feature locations corresponding with a deceleration consistent with an expected relatively static state at an expected future feature position.

4. The computer-implemented method of claim 2, wherein said function is an interpolation or an extrapolation of said sequentially acquired user feature locations.

5. The computer-implemented method of claim 2, wherein said function is a function of time since said designated condition for movement was met.

6. The computer-implemented method of claim 5, wherein said designated period of time is between about 0.02 s and 1 s.

7. The computer-implemented method of claim 1, wherein said threshold velocity is between 0.02 m/s and 0.2 m/s.

8. The computer-implemented method of claim 7, wherein said threshold velocity is approximately 0.03 m/s.

9. The computer-implemented method of claim 1, wherein said digitally rendering the light field content via the light field display comprises:
digitally mapping a digital image on an adjusted image plane designated to provide the user with a designated image perception adjustment;
associating adjusted image pixel data with at least some pixels of the light field display in accordance with said mapping; and
rendering said adjusted image pixel data via said at least some pixels thereby rendering said light field content in accordance with a perceptively adjusted version of the digital image.

10. The computer-implemented method of claim 1, further comprising digitally computing said designated threshold velocity in accordance with a digital calibration process.

11. The computer-implemented method of claim 10, wherein said designated threshold velocity is digitally computed as a function of a distribution parameter of said user feature locations sequentially acquired over a designated duration of said digital calibration process.

12. The computer-implemented method of claim 11, wherein said digital calibration process comprises providing a calibration indicator during said designated duration to indicate a calibration status of said digital calibration process.

13. The computer-implemented method of claim 1, wherein said sequentially acquiring said user feature location comprises sequentially acquiring a two-dimensional or a three-dimensional user feature location.

14. The computer-implemented method of claim 1, wherein said user feature location comprises a user pupil location.

15. The computer-implemented method of claim 1, wherein said user feature location corresponds at least in part to a facial landmark having a characteristic disposition with respect to a user eye.

16. The computer-implemented method of claim 15, further comprising digitally computing said user feature location at least in part based on sequentially acquired locations of said facial landmark.

17. The computer-implemented method of claim 1, wherein the light field display is configured to render the light field content in accordance with a digital three-dimensional ray tracing process.

18. A non-transitory computer-readable medium having instructions stored thereon to be automatically implemented by one or more processors for improving a perceptive experience of light field content projected via a light field display within a light field viewing zone by:
sequentially acquiring a user feature location;
digitally computing from at least some said sequentially acquired user feature location a velocity of said user feature location over time;
digitally comparing said velocity with a designated threshold velocity, wherein velocities below and above said designated threshold are respectively associated with a relatively static and a relatively dynamic state;
digitally rendering the light field content via the light field display in accordance with a maintained light field viewing zone geometry digitally defined in respect of a previously acquired user feature location to project the light field content within a maintained light field viewing zone in accordance with said previously acquired user feature location; and
upon said velocity corresponding with a transition from said relatively dynamic state to said relatively static state, digitally adjusting a rendering geometry of the light field content via the light field display so to correspondingly adjust said maintained light field viewing zone geometry to project the light field content within an adjusted light field viewing zone in accordance with a newly acquired user feature location.

19. The non-transitory computer-readable medium of claim 18, further comprising instructions for digitally computing said designated threshold velocity in accordance with a digital calibration process.

20. The non-transitory computer-readable medium of claim 19, wherein said designated threshold velocity is digitally computed as a function of a distribution parameter of said user feature locations sequentially acquired over a designated duration of said digital calibration process.

21. The non-transitory computer-readable medium of claim 18, wherein said user feature location comprises at least one of a user pupil location or a facial landmark having a characteristic disposition with respect to a user eye.

22. The non-transitory computer-readable medium of claim 18, wherein the light field display is configured to render the light field content in accordance with a digital three-dimensional ray tracing process.

23. A digital display device operable to improve a perceptive experience of light field content projected via a light field display within a light field viewing zone, the device comprising:
a light field display;
a hardware processor; and
a user feature tracking engine operable by said hardware processor to automatically:
receive as input a sequentially acquired user feature location;
digitally compute from at least some said sequentially acquired user feature locations a velocity of said user feature location over time; and
digitally compare said velocity with a designated threshold velocity, wherein velocities below and above said designated threshold are respectively associated with a relatively static and a relatively dynamic state;
wherein said hardware processor is operable to improve perception of the light field content by:
digitally rendering the light field content via the light field display in accordance with a maintained light field viewing zone geometry digitally defined in respect of a previously acquired user feature location to project the light field content within a maintained light field viewing zone in accordance with said previously acquired user feature location; and
upon said velocity corresponding with a transition from said relatively dynamic state to said relatively static state, digitally adjusting a rendering geometry of the light field content via the light field display so to correspondingly adjust said maintained light field viewing zone geometry to project the light field content within an adjusted light field viewing zone in accordance with a newly acquired user feature location.

24. The digital display device of claim 23, wherein said user feature tracking engine is further operable by said hardware processor to automatically digitally compute said designated threshold velocity in accordance with a digital calibration process.

25. The digital display device of claim 24, wherein said designated threshold velocity is digitally computed as a function of a distribution parameter of said user feature locations sequentially acquired over a designated duration of said digital calibration process.

26. The digital display device of claim 23, wherein the light field display is configured to render the light field content in accordance with a digital three-dimensional ray tracing process.

* * * * *